US012705939B2

(12) United States Patent
Nishii et al.

(10) Patent No.: US 12,705,939 B2
(45) Date of Patent: Aug. 11, 2026

(54) AUTOMATIC RUN METHOD, AUTOMATIC RUN SYSTEM, AND AUTOMATIC RUN PROGRAM

(71) Applicant: Yanmar Holdings Co., Ltd., Osaka (JP)

(72) Inventors: Yasuto Nishii, Okayama (JP); Masaaki Murayama, Okayama (JP); Akifumi Kuroda, Okayama (JP); Shinya Nishibeppu, Okayama (JP); Masahito Adachi, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 260 days.

(21) Appl. No.: 18/229,912

(22) Filed: Aug. 3, 2023

(65) Prior Publication Data

US 2024/0046716 A1 Feb. 8, 2024

(30) Foreign Application Priority Data

Aug. 4, 2022 (JP) ................................ 2022-124939

(51) Int. Cl.
*G07C 5/00* (2006.01)
*G05D 1/00* (2006.01)
*G07C 5/08* (2006.01)

(52) U.S. Cl.
CPC ......... *G07C 5/0816* (2013.01); *G05D 1/0027* (2013.01); *G07C 5/008* (2013.01)

(58) Field of Classification Search
CPC .... G07C 5/0816; G07C 5/008; G05D 1/0027; G05D 1/2246; G05D 1/2295; G05D 1/249; G05D 1/6482; G05D 1/6987; G05D 2105/15; G05D 2107/21; G05D 2109/10; A01B 69/008; A01B 69/00; E02F 9/2033;
(Continued)

(56) References Cited

U.S. PATENT DOCUMENTS 6,226,572 B1 5/2001 Tojima et al.
6,337,971 B1 * 1/2002 Abts .................... H04L 51/222 331/65
9,704,396 B1 * 7/2017 Owens ................ G08G 1/0965
(Continued)

FOREIGN PATENT DOCUMENTS

WO 2015/119266 A1 8/2015
WO 2017159801 A1 9/2017

OTHER PUBLICATIONS

Conesa-Muñoz, J.; Gonzalez-de-Soto, M.; Gonzalez-de-Santos, P.; Ribeiro, A. Distributed Multi-Level Supervision to Effectively Monitor the Operations of a Fleet of Autonomous Vehicles in Agricultural Tasks. Sensors 2015, 15, 5402-5428. https://doi.org/10.3390/s150305402 (Year: 2015).*
(Continued)

*Primary Examiner* — Anne Marie Antonucci
*Assistant Examiner* — Jordan T Smith
(74) *Attorney, Agent, or Firm* — NORTON ROSE FULBRIGHT US LLP

(57) ABSTRACT

A detection process unit detects an error of at least any of a plurality of work vehicles. A report process unit causes, when an error of a work vehicle among the plurality of work vehicles is detected, specific information on the work vehicle to be reported at an operation terminal communicable with each of the plurality of work vehicles.

13 Claims, 29 Drawing Sheets

(58) Field of Classification Search
CPC ......... E02F 9/2045; E02F 9/205; E02F 9/262; E02F 9/268; E02F 9/2054
See application file for complete search history.

(56) References Cited

U.S. PATENT DOCUMENTS

| | | | | |
|---|---|---|---|---|
| 10,433,110 | B1 * | 10/2019 | Bergerhouse ......... | H04W 4/023 |
| 10,860,016 | B1 | 12/2020 | Wang et al. | |
| 2013/0211623 | A1 * | 8/2013 | Thompson .............. | H04L 67/12<br>701/1 |
| 2014/0240088 | A1 * | 8/2014 | Robinette .......... | G08B 21/0219<br>340/5.61 |
| 2020/0281110 | A1 * | 9/2020 | McNichols ............. | G01S 19/14 |
| 2021/0179014 | A1 * | 6/2021 | Hasegawa .............. | H04B 17/27 |
| 2021/0339729 | A1 * | 11/2021 | O'Connor ............ | A01D 43/077 |
| 2022/0366730 | A1 * | 11/2022 | Mangus ............. | G05B 23/0259 |
| 2022/0392033 | A1 * | 12/2022 | De Steuben .............. | G06T 7/97 |
| 2023/0345856 | A1 * | 11/2023 | Mähler .............. | A01D 41/1278 |
| 2024/0345603 | A1 * | 10/2024 | Fujii ...................... | G06Q 50/02 |
| 2025/0089596 | A1 * | 3/2025 | Edo ........................ | A01B 76/00 |

OTHER PUBLICATIONS

Extended European Search Report dated Nov. 30, 2023 issued in EP Application No. 23185974.5.

* cited by examiner

E1

| ROUTE ID | START FIELD | END FIELD | POSITION INFORMATION | SPEED INFORMATION |
|---|---|---|---|---|
| R001 | F1 | F2 | Pf12 | Vf12 |
| R002 | F3 | F4 | Pf34 | Vf34 |
| R003 | F1 | F10 | Pf110 | Vf110 |
| R004 | F4 | F15 | Pf415 | Vf415 |
| ... | ... | ... | ... | ... |

AUTOMATIC RUN METHOD, AUTOMATIC RUN SYSTEM, AND AUTOMATIC RUN PROGRAM

CROSS-REFERENCE TO RELATED APPLICATIONS

This application claims priority under 35 U.S.C. § 119 to JP Application No. 2022-124939 filed Aug. 4, 2022 the entire contents of which are hereby incorporated by reference.

TECHNICAL FIELD

The present invention relates to an automatic run method, an automatic run system, and an automatic run program for causing a work vehicle to automatically run.

BACKGROUND ART

Conventionally, a work vehicle capable of performing work while automatically running in a field is known. Further, there is a known technology that reports to an operation terminal of an operator when an interruption event should occur during the work vehicle's automatically running in the field (see, for example, Patent Document 1).

PRIOR ART DOCUMENT

Patent Document

Patent Document 1: PCT International Publication No. WO 2015/119266

SUMMARY OF INVENTION

Technical Problem

In recent years, a work form in which plural work vehicles automatically run at the same time in one field, or plural work vehicles automatically run at the same time in plural fields, has become widespread. In this case, an operator, a monitor, or other user must at the same time monitor the plural work vehicles, making it difficult, when an error should occur to the work vehicle, for example, to grasp the work vehicle.

It is an object of the present invention to provide an automatic run method, an automatic run system, and an automatic run program that enable a user to easily grasp, when a plurality of work vehicles is automatically running, a work vehicle to which an error has occurred.

Solution to Problem

An automatic run method according to the present invention is an automatic run method that performs operations including: causing each of a plurality of work vehicles to automatically run in a work area; detecting an error of at least any of the plurality of work vehicles; and causing, when an error of a first work vehicle among the plurality of work vehicles is detected, specific information on the first work vehicle to be reported at an operation terminal communicable with each of the plurality of work vehicles.

An automatic run system according to the present invention includes: a run process unit; a detection process unit; and a report process unit. The run process unit causes each of a plurality of work vehicles to automatically run in a work area. The detection process unit detects an error of at least any of the plurality of work vehicles. The report process unit, when an error of a first work vehicle among the plurality of work vehicles is detected, causes specific information on the first work vehicle to be reported at an operation terminal communicable with each of the plurality of work vehicles.

An automatic run program according to the present invention is an automatic run program for causing one or more processors to perform operations including: causing each of a plurality of work vehicles to automatically run in a work area; detecting an error of at least any of the plurality of work vehicles; and causing, when an error of a first work vehicle among the plurality of work vehicles is detected, specific information on the first work vehicle to be reported at an operation terminal communicable with each of the plurality of work vehicles.

Advantageous Effects of Invention

The present invention can provide an automatic run method, an automatic run system, and an automatic run program that enable a user to easily grasp, when a plurality of work vehicles is automatically running, a work vehicle to which an error has occurred.

DESCRIPTION OF EMBODIMENTS

The following embodiments are each an example of embodying the present invention, and are not intended to limit the technical scope of the present invention.

Figure 1:
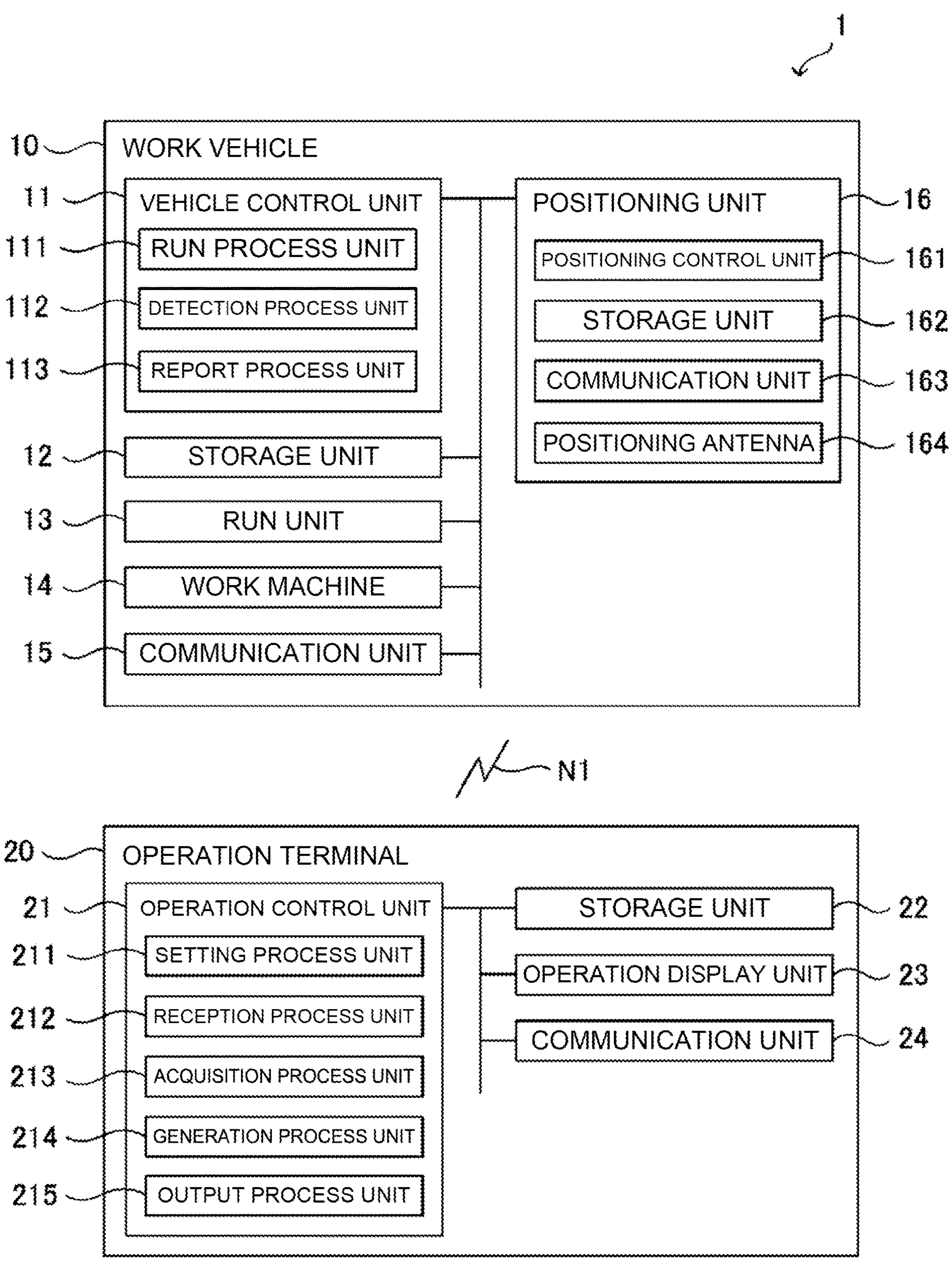
FIG. 1 is a block diagram showing a configuration of an automatic run system according to an embodiment of the present invention.

As shown in FIG. 1, an automatic run system 1 according to an embodiment of the present invention includes a work vehicle 10 and an operation terminal 20. The work vehicle 10 and the operation terminal 20 can communicate with each other via communication network N1. For example, the work vehicle 10 and the operation terminal 20 can communicate with each other via a mobile phone line network, a packet line network, or a wireless LAN.

In the present embodiment, a case where the work vehicle 10 is a tractor is to be described as an example. Further, as another embodiment, the work vehicle 10 may be a rice transplanter, a combine harvester, a construction machine, a snowplow, or the like. The work vehicle 10 is provided with a configuration capable of automatically running (autonomously running) within a field following a preset target route. Further, the work vehicle while automatically running within the field, can perform given work. Further, the work vehicle 10 has a configuration that can perform an automatic run along a road (connection route), which connects between plural fields, following a preset inter-field route. Based on the work vehicle 10's current position information calculated by a positioning unit 16, the work vehicle automatically runs following the target route and the inter-field route which are preset inside the field and outside the field (road).

Figure 3:
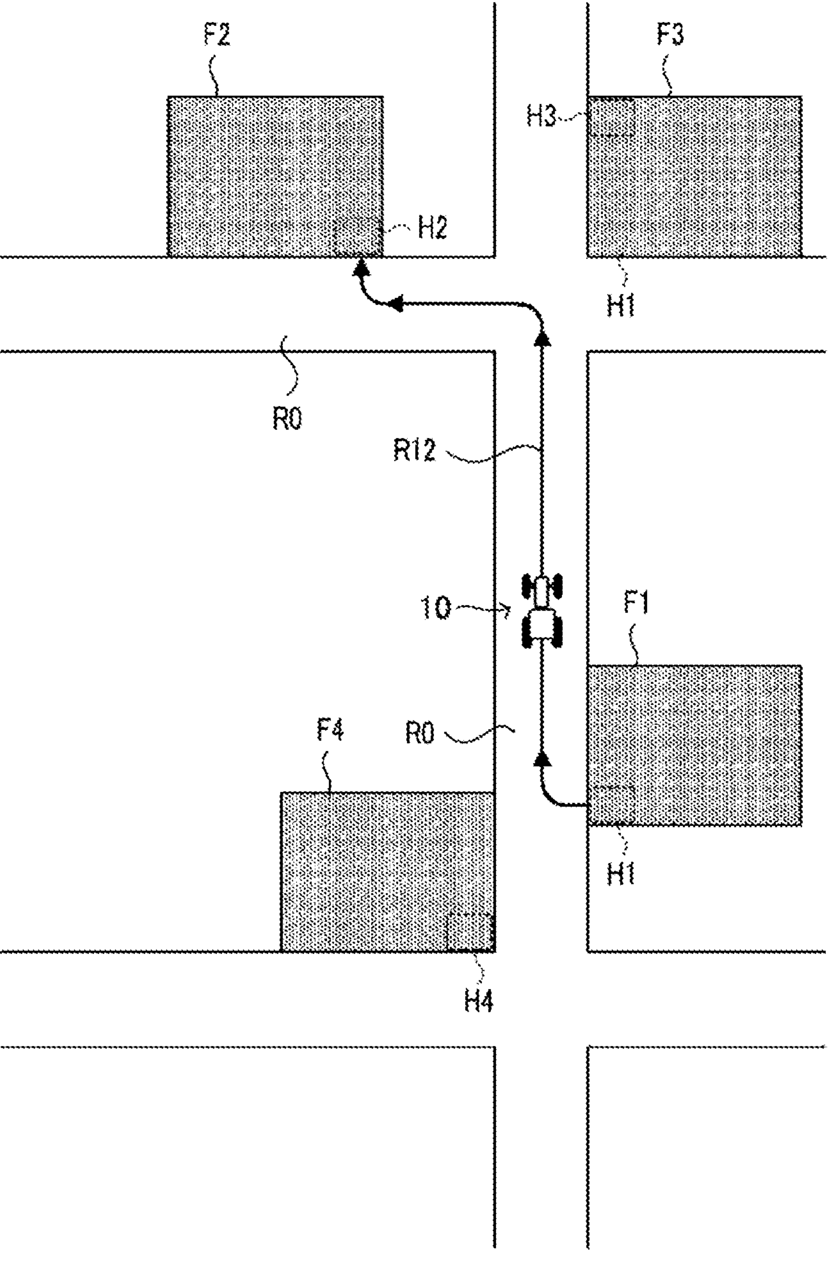
FIG. 3 is a diagram showing an example of an inter-field route of the work vehicle according to the embodiment of the present invention.
Figure 4A:
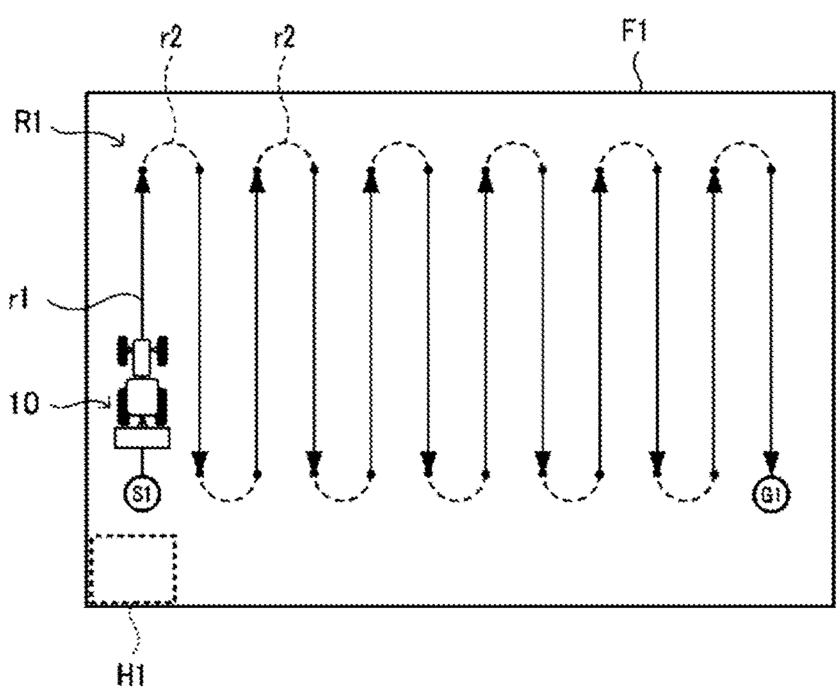
FIG. 4A is a diagram showing an example of a target route of the work vehicle according to the embodiment of the present invention.

In a field F1 shown in FIG. 3 and FIG. 4A, for example, the work vehicle 10 performs a given work while automatically running following a preset target route R1 (work route). Ending the work in the field F1, the work vehicle 10 automatically runs on an inter-field route R12 (movement route), on which a road R0 is preset, thereby to move to a field F2. For example, the work vehicle 10 automatically runs on the inter-field route R12 that connects an entrance/exit H1 of the field F1 with an entrance/exit H2 of the field F2. Arriving at the field F2, the work vehicle 10, in the field F2 (see FIG. 3 and FIG. 4B), performs the given work while automatically running following a preset target route R2 (work route). The target route R1 in the field F1 and the target route R2 in the field F2 are properly set according to respective work contents. Further, the inter-field route R12 of the road R0 is set according to an operation (teaching operation) by an operator (user). In the present embodiment, the inter-field route R12 on the road R0 along which route the work vehicle 10 moves from the field F1 to the field F2 is raised as an example; however, the inter-field route R12 may be a route on the road R0 along which route the work vehicle 10 moves from the field F2 to the field F1. Further; when the work vehicle 10 sequentially moves through three or more fields, the inter-field routes may be set for the respective fields. The inter-field route R12 is an example of an inter-area route of the present invention. Further, the inter-area route of the present invention may not be a route for moving a field to another field (inter-field route), but may be a route only for merely moving from a first point to a second point on the road R0 (inter-point route). Further, the first and second points may be positions designated by the user on a map.

Note that the connection route of the present invention may be a work vehicle dedicated-road, such as a farm road, a forest road, a public road, a private road, a motorway, or the like, and may be a road through which a general vehicle (such as a passenger vehicle or the like) can pass.

[Work Vehicle 10]

Figure 2:
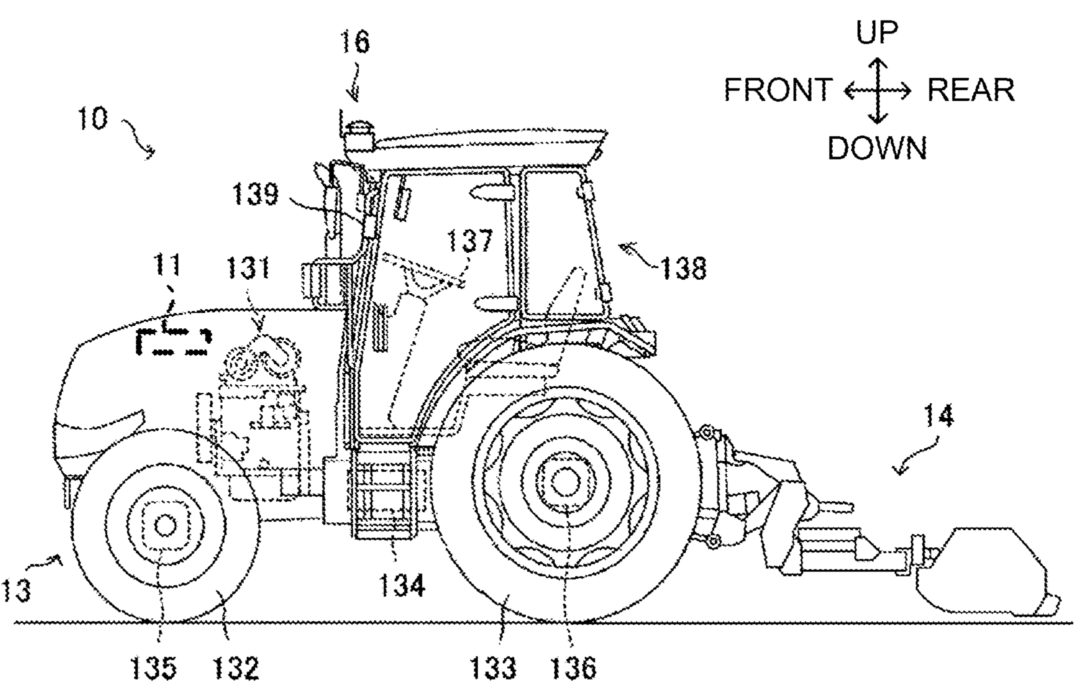
FIG. 2 is an external view of an example of a work vehicle according to the embodiment of the present invention.

As shown in FIG. 1 and FIG. 2, the work vehicle 10 has a vehicle control unit 11, a storage unit 12, a run unit 13, a work machine 14, a communication unit 15, a positioning unit 16, and the like. The vehicle control unit 11 is electrically connected to the storage unit 12, the run unit 13, the work machine 14, the positioning unit 16, and the like. Note that the vehicle control unit 11 and the positioning unit 16 may be wirelessly communicable.

The communication unit 15 is a communication interface that connects the work vehicle 10 to the communication network N1 by wire or wireless means, so as to perform, via the communication network N1, data communication, which accords to a given communication protocol, with an external device such as an operation terminal 20. The work vehicle 10, via the communication unit 15, can perform the wireless communication with the operation terminal 20.

The storage unit 12 is a non-volatile storage unit such as an HDD (Hard Disk Drive) or an SSD (Solid State Drive) that stores various types of information. The storage unit 12 stores a control program such as an automatic run program for causing the vehicle control unit 11 to perform an automatic run process (see FIG. 17) described below. For example, the automatic run program is non-transiently recorded in a computer-readable record medium, such as a flash ROM, an EEPROM, a CD, a DVD, or the like, is read by a given read unit (not shown), and is stored in the storage unit 12. Note that the automatic run program may be downloaded from a server (not shown) via the communication network N1 to the work vehicle 10 thereby to be stored in the storage unit 12. Further, the storage unit 12 may store route data of a target route and inter-field route which data is generated at the operation terminal 20.

The run unit 13 is a drive unit that causes the work vehicle 10 to run. As shown in FIG. 2, the run unit 13 includes an engine 131 (drive source), front wheels 132, rear wheels 133, a transmission 134, a front axle 135, a rear axle 136, a steering wheel 137, and the like. Note that the front wheels 132 and the rear wheels 133 are respectively provided at right and left of the work vehicle 10. Further, the run unit 13 is not limited to of a wheel type including the front wheels 132 and the rear wheels 133, but may be of a crawler type including crawlers provided to the right and left of the work vehicle 10.

The engine 131 is a drive source such as a diesel engine or a gasoline engine driven by using a fuel supplied to a fuel tank (not shown). The run unit 13 may include an electric motor as a drive source, together with the engine 131 or instead of the engine 131. Note that a power generator (not shown) is connected to the engine 131, and electric power is supplied from the power generator to an electric component such as the vehicle control unit 11, a battery, and the like, which are provided in the work vehicle 10. Note that the battery is charged with the electric power supplied from the power generator. Then, the electric components, such as the vehicle control unit 11, the positioning unit 16, and the like, which are provided in the work vehicle 10 can be driven, even after the engine 131 stops, by the electric power supplied from the battery.

A drive force of the engine 131 is transmitted via the transmission 134 and the front axle 135 to the front wheel 132, and is transmitted via the transmission 134 and the rear axle 136 to the rear wheel 133. Further, the drive force of the engine 131 is transmitted via a PTO shaft (not shown) also to the work machine 14. For the work vehicle 10 to perform the automatic run, the run unit 13 performs a run action according to an instruction of the vehicle control unit 11.

The work machine 14 is, for example, a mower, a cultivator, a plow, a fertilizer applicator, a seeding machine, a spraying machine, or the like, and is attachable to and detachable from the work vehicle 10. Thus, the work vehicle 10 can perform various types of work using each of the work machines 14. In the present embodiment, a case where the work machine 14 is a mower is to be described as an example.

For example, the work vehicle 10 attaches thereto a directly attach-type work machine 14 (mower), and while running within each of the field F1 and the field F2, performs the mowing work. Note that the work machine 14 is not limited to the directly attach-type work machine fixed to the work vehicle 10, but may be also a towing type work machine that is towed by the work vehicle 10.

Further; for running on the road R0 (see FIG. 3), the work vehicle 10 may run with the work machine 14 attached thereto or with the work machine 14 detached therefrom. For the work vehicle 10 to perform the mowing work in each of the field F1 and the field F2, for example, the work vehicle 10, after ending the mowing work in the field F1, runs on the road R0 with the mower attached thereto and moves to the field F2, and performs the mowing work in the field F2. Note that, the work vehicle 10, when including a function to up and down the work machine 14, runs on the road R0 with the work machine 14 upped. Further, for performing different types of work in the field F1 and the field F2 respectively, for example, the work vehicle 10, after ending the work in the field F1, runs on the road R0 with the work machine 14 detached therefrom and moves to the field F2, and performs the work in the field F2 with the work machine 14 attached thereto.

The steering wheel 137 is an operation unit operated by the operator or the vehicle control unit 11. In the run unit 13, for example, an angle of the front wheels 132 is changed by a hydraulic power steering mechanism (not shown) or the like according to the steering wheel 137's operation by the vehicle control unit 11, thus changing the proceeding direction of the work vehicle 10. When the operator performs the teaching operation (details thereof is to be described below), the operator operates the steering wheel 137 thereby to cause the work vehicle 10 to manually run.

Further, other than the steering wheel 137, the run unit 13 includes a shift lever, an accelerator, a brake and the like (not shown) which are operated by the vehicle control unit 11. Then, in the run unit 13, a gear of the transmission 134 is switched to a forward gear, a backward gear or the like according to the shift lever's operation by the vehicle control unit 11, and a run mode of the work vehicle 10 is switched to be forward, backward and the like. Further, the vehicle control unit 11 operates the accelerator thereby to control the revolution speed of the engine 131. Further, the vehicle control unit 11 operates the brake thereby to brake the rotations of the front wheels 132 and rear wheels 133 with an electromagnetic brake.

The positioning unit 16 is a communicator including a positioning control unit 161, a storage unit 162, a communication unit 163, a positioning antenna 164 and the like. For example, the positioning unit 16 is provided at an upper a part of a cabin 138 which the operator rides, as shown in FIG. 2. A site of placing the positioning unit 16 is not limited to the cabin 138. Further, the positioning control unit 161, storage unit 162, communication unit 163, and positioning antenna 164 of the positioning unit 16 may be placed in a dispersed manner in different positions in the work vehicle 10. Note that the battery is connected to the positioning unit 16 as described above, and the positioning unit 16 is operable even while the engine 131 is stopped. Further; as the positioning unit 16, a mobile phone terminal, a smart phone, a tablet terminal, or the like, for example, may be used as an alternative.

The positioning control unit 161 is a computer system having one or more processors, and a storage memory such as a non-volatile memory and a RAM. The storage unit 162 is a non-volatile memory or the like that stores a program for causing the positioning control unit 161 to perform a positioning process and data such as positioning information and movement information. The program is non-transiently recorded in a computer-readable record medium, such as a flash ROM, an EEPROM, a CD, a DVD, or the like, for example, is read by a given read unit (not shown) to be stored in the storage unit 162. Note that the program may be downloaded from a server (not shown) via the communication network N1 to the positioning unit 16, to be stored in the storage unit 162.

The communication unit 163 is a communication interface that connects the positioning unit 16 to the communication network N1 by wire or wireless means, so as to perform, via the communication network N1, data communication, which accords to a given communication protocol, with an external device such as a base station (not shown).

The positioning antenna 164 is an antenna which receives a radio wave (GNSS signal) sent from a satellite.

The positioning control unit 161 calculates the current position of the work vehicle 10 based on the GNSS signal which the positioning antenna 164 receives from the satellite. For the work vehicle 10 to automatically run in the field F1, in the field F2, on the road R0, and the like, the positioning antenna 164, when receiving radio waves (sending time, orbit information, or the like) sent from each of plural satellites, for example, causes the positioning control unit 161 to calculate a distance between the positioning antenna 164 and each of the satellites, thereby to calculate, based on the calculated distance, the current position (latitude and longitude) of the work vehicle 10. Further, the positioning control unit 161 may perform a positioning by a real-time kinematic method (RTK-GPS positioning method (RTK method)) in which the current position of the work vehicle 10 is calculated by using correction information that corresponds to the base station (reference station) near the work vehicle 10. As described above, the work vehicle 10 automatically runs by using the positioning information by the RTK method. Note that the current position of the work vehicle 10 may be the same as the positioning position (the position of the positioning antenna 164, for example), or may be a position shifted from the positioning position.

The vehicle control unit 11 has a control device such as a CPU, a ROM, and a RAM. The CPU is a processor that performs various types of arithmetic processes. The ROM is a non-volatile storage unit that preliminarily stores a control program, such as a BIOS, an OS, or the like, that causes the CPU to perform various types of arithmetic processes. The RAM is a volatile or non-volatile storage unit that stores various types of information, and is used as a transient storage memory (work area) of various processes performed by the CPU. Then, the vehicle control unit 11 causes the CPU to perform various types of control programs, which are preliminarily stored in the ROM or the storage unit 12, thereby controlling the work vehicle 10.

The vehicle control unit 11 controls the action of the work vehicle 10 according to the user's various operations on the work vehicle 10. Further, the vehicle control unit 11 performs an automatic run process of the work vehicle 10, based on the work vehicle 10's current position calculated by the positioning unit 16 and based on the target route and the inter-field route which are preset.

As shown in FIG. 1, the vehicle control unit 11 includes various types of process units, such as a run process unit 111, a detection process unit 112, a report process unit 113, and the like. Further, it is noted that the vehicle control unit 11, by the CPU, performs various processes, which accord with the automatic run program, thereby to function as the various processes units. Further, a part or all of the process units may include an electronic circuit. Further, the automatic run program may be a program for causing plural processors to function as the process units.

The run process unit 111 controls the run of the work vehicle 10. Specifically, the run process unit 111, when acquiring a run start instruction from the operation terminal 20, causes the work vehicle 10 to start the automatic run. When the operator presses down a start button on an operation screen of the operation terminal 20, for example, the operation terminal 20 outputs the run start instruction to the work vehicle 10. Acquiring the run start instruction from the operation terminal 20, the run process unit 111 causes the work vehicle 10 to start the automatic run. Thus, the work vehicle 10 starts the automatic run following the target route R1 (see FIG. 4A) in the field F1, for example, starting the work by the work machine 14. Further, the work vehicle 10 starts the automatic run following the target route R2 (see FIG. 4B) in the field F2, for example, starting the work by the work machine 14. Further, the work vehicle 10 performs the automatic run following the inter-field route R12 (see FIG. 3) on the road R0, for example. That is, the run process unit 111 can cause the work vehicle 10 to automatically run following the inter-field route R12 on the road R0 outside the field. For example, the run process unit 111 causes the work vehicle 10 to automatically run on the road R0, which connects the field F1 with the field F2, following the inter-field route R12 set on the road R0. Further, note that the target route and inter-field route on which the work vehicle 10 automatically runs are generated, for example, at the operation terminal 20. The work vehicle 10, from the operation terminal 20, acquires route data that corresponds to the target route and the inter-field route, and automatically runs following the target route and the inter-field route.

Further; acquiring the run stop instruction from the operation terminal 20, the run process unit 111 causes the work vehicle 10 to stop the automatic run. The operator, when pressing down the stop button on the operation screen of the operation terminal 20, for example, causes the operation terminal 20 to output the run stop instruction to the work vehicle 10.

Further, the run process unit 111, when the work vehicle 10 detects an obstacle, causes the work vehicle 10 to stop the automatic run. When an obstacle detection unit (not shown) installed on the work vehicle 10 detects an obstacle in a range of 3 m to 8 m in front of the work vehicle 10, for example, the run process unit 111 causes the work vehicle 10 to decelerate. Further; when the obstacle detection unit detects the obstacle in the range up to 3 m in front of the work vehicle 10, the run process unit 111 causes the work vehicle 10 stop. Specific configurations of the detection process unit 112 and report process unit 113 are to be described below.

[Operation Terminal 20]

As shown in FIG. 1, the operation terminal 20 is an information process unit that has an operation control unit 21, a storage unit 22, an operation display unit 23, a communication unit 24, and the like. The operation terminal 20 may include a portable terminal such as a tablet device or a smartphone, or may include a personal computer.

The communication unit 24 is a communication interface that connects the operation terminal 20 to the communication network N1 by wire or wireless means, so as to perform, via the communication network N1, data communication, which accords to a given communication protocol, with an external device such as the work vehicle 10 that is one or plural in number.

The operation display unit 23 is a user interface that has a display unit, such as a liquid crystal display or an organic EL display, that displays various types of information, and an operation unit, such as a touch screen, a mouse, or keyboard, that receives an operation. On the operation screen displayed on the display unit, the operator operates the operation unit thereby to make it possible to perform an operation of registering various types of information (such as work vehicle information, field information, work information, or the like to be described below).

Further, the operator, in the operation unit, performs an operation (teaching operation) of setting the inter-field route R12 for the work vehicle 10 to be caused to automatically run on the road R0 (connection route) that connects the field F1 with the field F2.

Further, the operator operates the operation unit thereby to make it possible to provide the run start instruction, the run stop instruction, and the like to the work vehicle 10. Further; in a place distant from the work vehicle 10, the operator, by a run track displayed at the operation terminal 20, can grasp a run state of the work vehicle 10 that automatically runs in the field F1, in the field F2, and on the road R0 following the target route and the inter-field route.

The storage unit 22 is a non-volatile storage unit, such as an HDD or an SSD, that stores various types of information. The storage unit 22 stores a control program such as an automatic run program for causing the operation control unit 21 to perform the automatic run process (see FIG. 17) described below. For example, the automatic run program is non-transiently recorded in a computer-readable record medium, such as a flash ROM, an EEPROM, a CD, a DVD, or the like, is read by a given read unit (not shown) to be stored in the storage unit 22. Note that the automatic run program may be downloaded from a server (not shown) via the communication network N1 to the operation terminal 20 thereby to be stored in the storage unit 22.

Further, an application dedicated to causing the work vehicle 10 to automatically run is placed in the storage unit 22. The operation control unit 21 activates the dedicated application, thereby to perform a set process of setting various types of information on the work vehicle 10, a generation process of generating the target route and inter-field route of the work vehicle 10, the automatic run instruction to the work vehicle 10, or the like.

Further, the storage unit 22 stores data, such as work the work vehicle information that is information on the work vehicle 10, the target route information that is information on the target route, or the like. For each of the work vehicles 10, the work vehicle information includes information such as the vehicle number and a vehicle model. The vehicle number is identification information of the work vehicle 10. The vehicle model is a vehicle model of the work vehicle 10. Note that the storage unit 22 may store any of the work vehicle information on the one work vehicle 10 and the work vehicle information on a plurality of work vehicles 10. For example, when a particular operator owns a plurality of work vehicles 10, the storage unit 22 stores the work vehicle information on each of the work vehicles 10.

For each of the target routes, the target route information includes information, such as a route name, a field name, an address, a field area, a work time, or the like. The route name is a route name of the target route generated in the operation terminal 20. The field name is a name of the field which is a work target for which the target route is set. The address is an address of the field, and the field area is an area of the field. The work time is a time required for the work vehicle 10 to perform the work in the field.

When the target route is a route (inter-field route) that corresponds to the road R0, the target route information includes information such as the route name, the address, the run distance, the run time, or the like. The route name is a name of the road R0, and the address is an address of the road R0. The run distance is a distance the work vehicle 10 runs on the road R0, for example, a distance from the field F1 to the field F2. The run time is a time during which the work vehicle 10 runs on the road R0, and is a time required for the work vehicle 10 to move from the field F1 to the field F2, for example.

Note that the storage unit 22 may store the target route information on a single target route, or may store the target route information on a plurality of target routes. For example, when the particular operator generates a plurality of target routes for one or more fields owned by the operator, the target route information on each of target routes is stored in the storage unit 22. Note that, for a single field, a single target route may be set or a plurality of target routes may be set. Further, for a single set of fields, a single inter-field route may be set and a plurality of inter-field routes may be set. In the present embodiment, the storage unit 22 stores the target route information that corresponds to the target route R1 for running in the field F1 (see FIG. 4A), the target route information that corresponds to the target route R2 for running in the field F2 (see FIG. 4B), and the target route information that corresponds to the inter-field route R12 for running on the road R0 (see FIG. 3).

As another embodiment, a part or all of the information such as the work vehicle information and the target route information may be stored in a server accessible from the operation terminal 20. The operator may perform an operation that registers the work vehicle information and the target route information in the server (for example, a personal computer, a cloud server, and the like). In this case, the operation control unit 21 may acquire the information from the server and perform each process such as the automatic run process (see FIG. 17) described below.

The operation control unit 21 has a control device such as a CPU, a ROM, and a RAM. The CPU is a processor that performs various types of arithmetic processes. The ROM is a non-volatile storage unit that preliminarily stores a control program, such as a BIOS, an OS, or the like, that causes the CPU to perform various types of arithmetic processes. The RAM is a volatile or non-volatile storage unit that stores various types of information, and is used as a transient storage memory of various processes performed by the CPU. Then, the operation control unit 21 causes the CPU to perform various control programs, which are preliminarily stored in the ROM or the storage unit 22, thereby to control the operation terminal 20.

As shown in FIG. 1, the operation control unit 21 includes various process units such as a setting process unit 211, a reception process unit 212, an acquisition process unit 213, a generation process unit 214, and an output process unit 215. Further, the operation control unit 21 causes the CPU to perform the various processes, which accord to the control programs, thereby to function as the various process units. Further, a part or all of the process units may include an electronic circuit. Note that the control program may be a program that causes a plurality of processors to function as the process units.

Figure 5A:
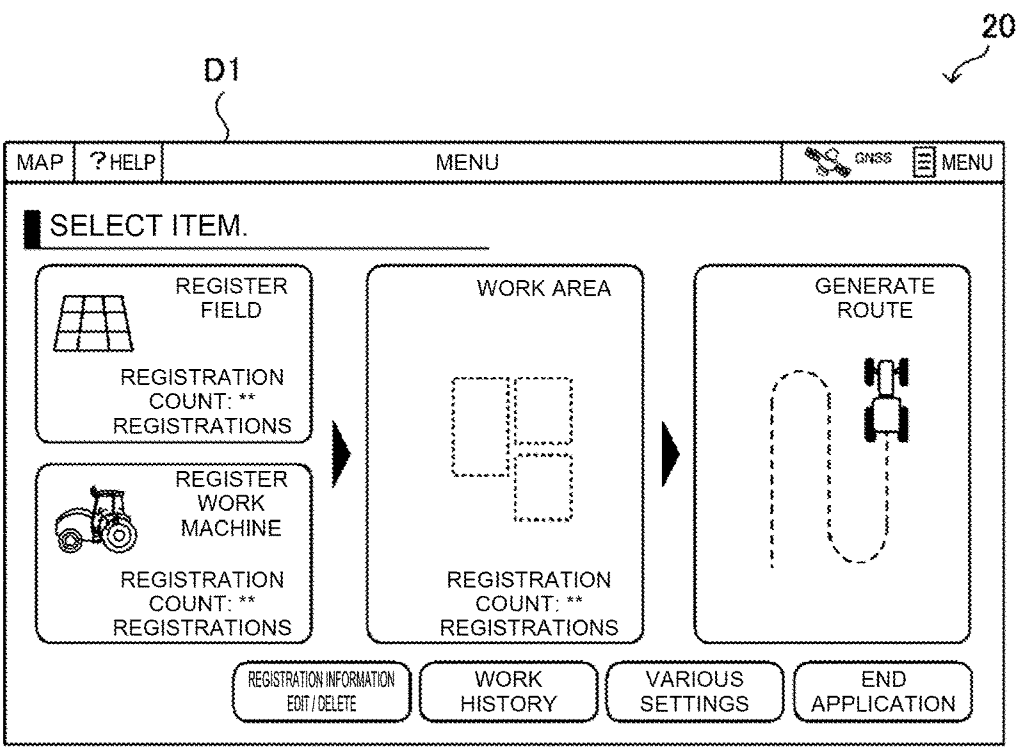
FIG. 5A is a diagram showing an example of a menu screen displayed on an operation terminal according to the embodiment of the present invention.

The setting process unit 211 sets information on the work vehicle 10 (hereinafter, referred to as work vehicle information), information on the field (hereinafter, referred to as field information), and information on the specific way how to perform work (hereinafter, referred to as work information). The setting process unit 211, on a menu screen D1 shown in FIG. 5A, for example, receives a setting operation by the operator, and registers each setting information.

Specifically, the operator's operation of registration in the operation terminal 20 causes the setting process unit 211 to set information such as the machine type of the work vehicle 10, the position where the positioning antenna 164 is mounted on the work vehicle 10, the type of the work machine 14, the size and shape of the work machine 14, the work machine 14's position relative to the work vehicle 10, the vehicle speed and engine revolution speed during the work of the work vehicle 10, and the vehicle speed and engine revolution speed during the turn of the work vehicle 10.

Further, the operator's operation of registration in the operation terminal 20 causes the setting process unit 211 to set information such as the position and shape of the field, the work start position to start the work (run start position) and the work end position to end the work (run end position), and the work direction, etc.

The operator that rides on the work vehicle 10 so drives as to circle once along an outer periphery of the field, and records the then transition of position information of the positioning antenna 164, for example, thereby making it possible to automatically acquire the information on the position and shape of the field. Further, the position and shape of the field can be acquired based on a polygon shape acquired by the operator to operate the operation terminal 20 with a map displayed at the operation terminal 20 and to designate a plurality of points on the map. An area specified by the acquired position and shape of the field is an area (run area) where the work vehicle 10 can be caused to run.

Figure 4B:
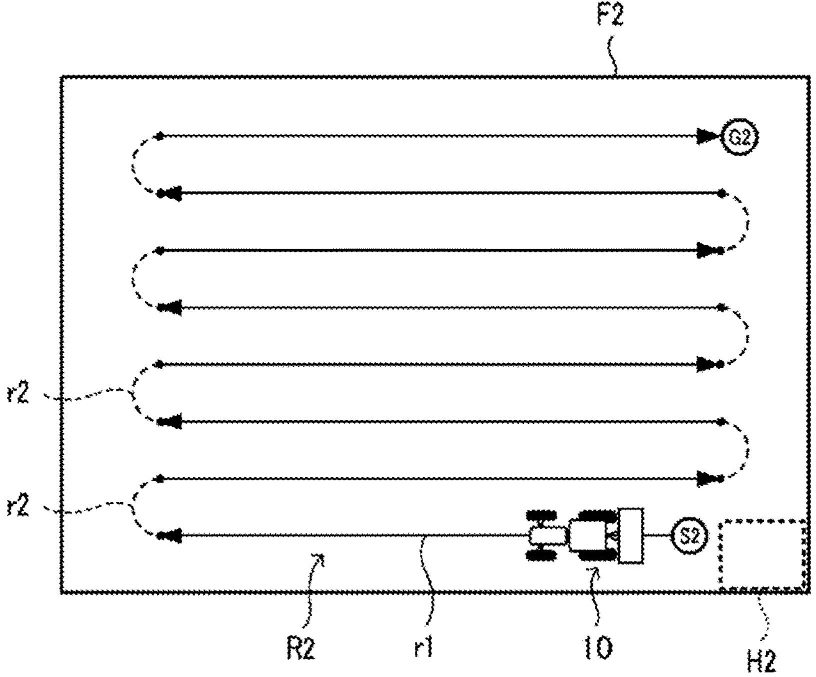
FIG. 4B is a diagram showing the example of the target route of the work vehicle according to the embodiment of the present invention.

The setting process unit 211 registers the field information of the field F1 shown in FIG. 4A and the field information of the field F2 shown in FIG. 4B, for example.

Further, the setting process unit 211 is so configured as to be capable of setting, as the work information, presence or absence of cooperative work between the work vehicle 10 (unmanned tractor) and the manned work vehicle 10, the number of skips which is the number of work routes to be skipped when the work vehicle 10 turns in a headland, a width of the headland, a width of a non-cultivated land, and the like.

Further; based on the each setting information, the setting process unit 211 generates the target route for causing the work vehicle 10 to automatically run in the field. Specifically, the setting process unit 211 generates the target route in the field based on the run start position and the run end position which are registered in the field setting. For example, as shown in FIG. 4A, the setting process unit 211, based on the setting operation by the operator, generates the target route R1 including a run start position S1, a run end position G1, a straight ahead route r1 (solid line in FIG. 4A), and a turn route r2 (dotted line in FIG. 4A). Further, for example, as shown in FIG. 4B, the setting process unit 211, based on the setting operation by the operator, generates a target route R2 including a run start position S2, a run end position G2, a straight ahead route r1 (solid line in FIG. 4B), and a turn route r2 (dotted line in FIG. 4B). The setting process unit 211 registers the generated target route R1 in association with the field F1, and registers the generated target route R2 in association with the field F2.

Here, the operation control unit 21, based on the operation (teaching operation) by the operator, generates the inter-field route of the road R0 connecting between the plural fields, as described below.

Specifically, the reception process unit 212 receives the run operation by the operator. For example, the reception process unit 212 receives the run operation (manual steering) that causes the work vehicle 10 to manually run from the field F1 to the field F2. From the positioning unit 16, the acquisition process unit 213 acquires the position information of the work vehicle 10 which runs, based on the run operation by the operator, on the road R0 that connects the field F1 with the field F2. Based on the position information acquired based on the run operation by the operator, the generation process unit 214 generates the inter-field route R12 for causing the work vehicle 10 to automatically run between the field F1 and the field F2.

Figure 5B:
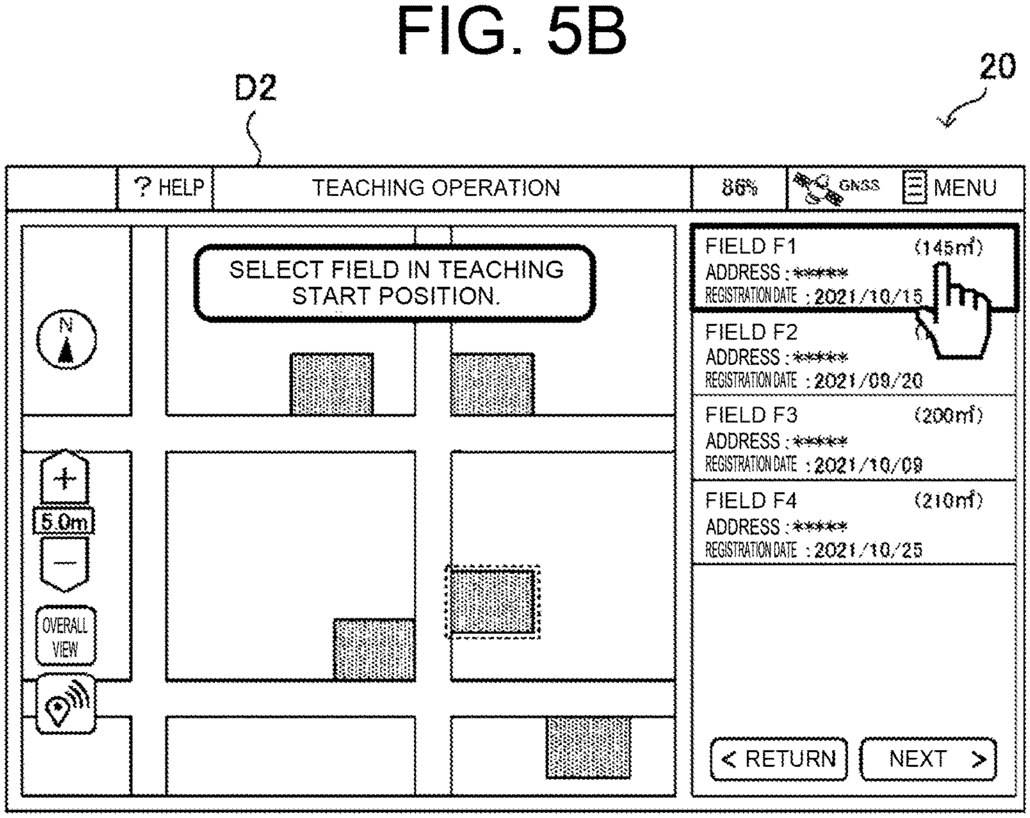
FIG. 5B is a diagram showing an example of a teaching operation screen displayed at the operation terminal according to the embodiment of the present invention.

The reception process unit 212 causes, for example, a teaching operation screen D2 shown in FIG. 5B to display, thereby to receive, from the operator, an operation to select the field. The teaching operation screen D2 displays a list of the field information of a plurality of fields registered by the setting process unit 211. On the teaching operation screen D2, the operator selects the plurality of fields to be targets of the inter-field route.

First, the operator selects the field (here, the field F1) that starts the teaching operation (see FIG. 5B). When the operator selects the field F1, the reception process unit 212 causes the selected field F1 to be identifiably displayed (dotted line frame image displayed) on the map of the teaching operation screen D2 (see FIG. 5B).

Figure 5C:
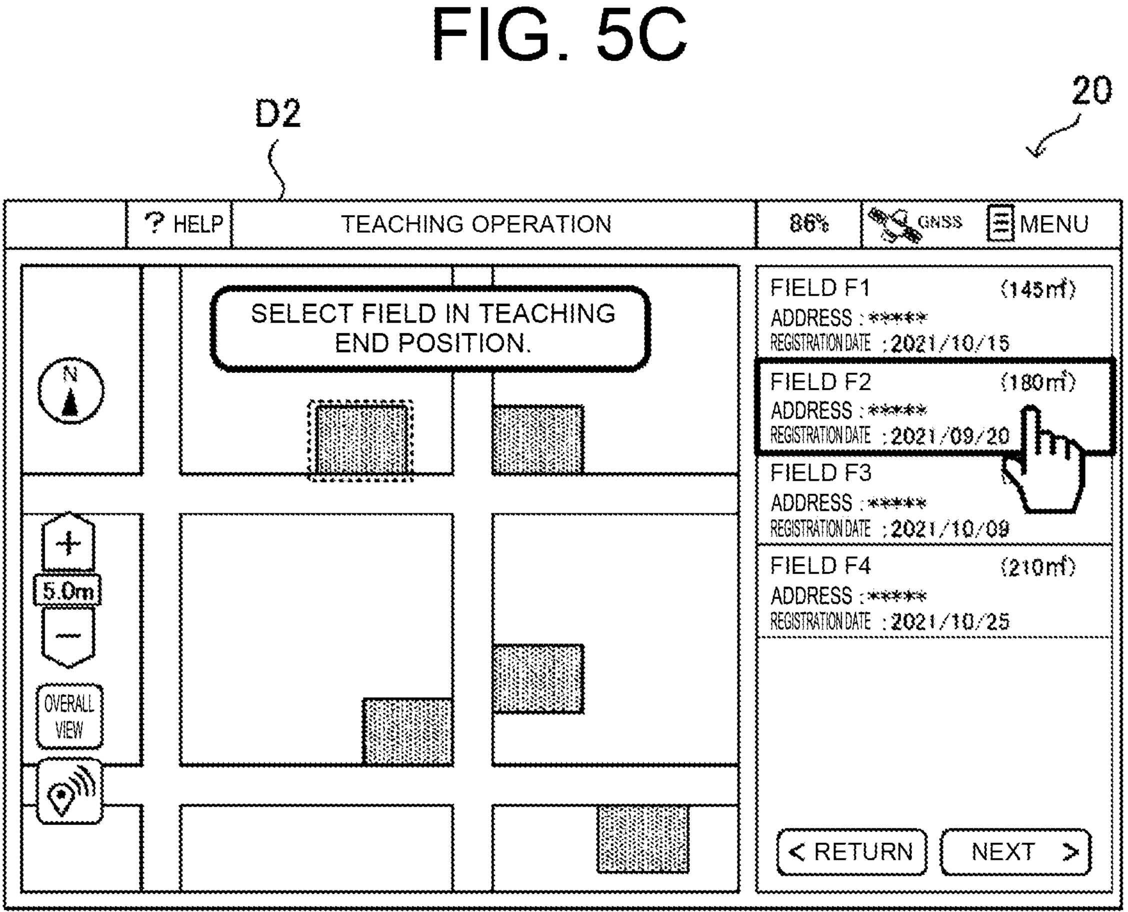
FIG. 5C is a diagram showing the example of the teaching operation screen displayed at the operation terminal according to the embodiment of the present invention.

Next, the operator selects the field (here, the field F2) that ends the teaching operation (see FIG. 5C). When the operator selects the field F2, the reception process unit 212 causes the selected field F2 to be identifiably displayed (dotted line frame image displayed) on the map of the teaching operation screen D2 (see FIG. 5C).

Receiving, from the operator, the operation of selecting the plurality of fields to be targets of the inter-field route, the reception process unit 212 receives the operation of starting the teaching run. On the teaching operation screen D2 shown in FIG. 6A, for example, the operator pressing down a start button causes the reception process unit 212 to receive the operation of starting the teaching run. The reception process unit 212, when receiving the starting operation, sets a route start point Ts1 in the field F1. The reception process unit 212 sets, as the route start position Ts1, the work vehicle 10's current position at the time point of having received the starting operation, for example.

As another embodiment; the reception process unit 212, when receiving the starting operation from the operator in a state of the work vehicle 10 positioned in a given area in the field F1, may set the route start point Ts1 in the field F1. Provided that the work vehicle 10 is positioned in an area of the entrance/exit H1 in the field F1 (see FIG. 4A), for example, the reception process unit 212 receives the starting operation by the operator and sets the route start position Ts1 in the field F1. Contrary to the above; when the work vehicle 10 is positioned outside the area of the entrance/exit H1 in the field F1, the reception process unit 212, even when having received the starting operation by the operator, does not set the route start point Ts1 in the field F1. In this case, the reception process unit 212 may make a notification of a message showing that the route start point Ts1 is not settable, a message encouraging to move the work vehicle 10 into the area of the entrance/exit H1, or the like. According to this configuration, the start point of the inter-field route for moving between the fields can be set in a specific area (for example, the entrance/exit H1), thus making it possible to limit a position for moving from inside the field to outside the field.

Figure 6A:
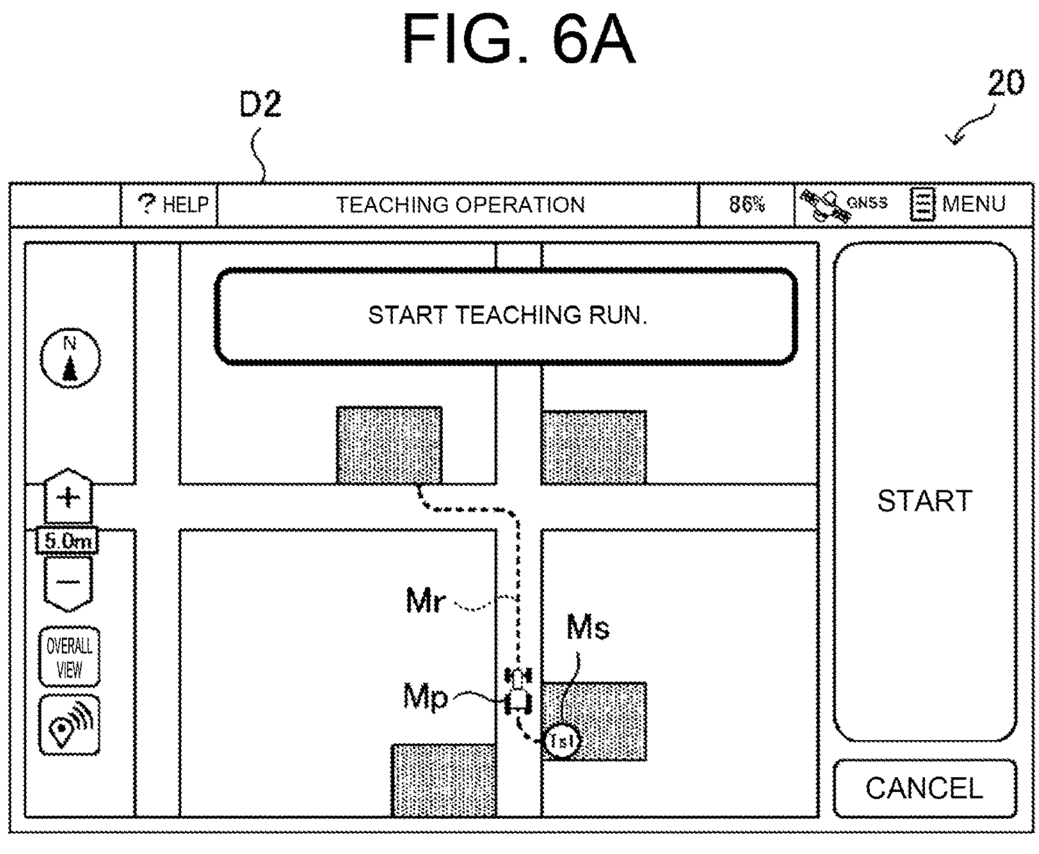
FIG. 6A is a diagram showing the example of the teaching operation screen displayed at the operation terminal according to the embodiment of the present invention.

Receiving the starting operation from the operator, the reception process unit 212 causes a route start position image Ms, which shows the route start position Ts1 in the entrance/exit H1 of the field F1, to be displayed on the map of the teaching operation screen D2 (see FIG. 6A). Further, the reception process unit 212 causes to display, as information for supporting the run operation of the teaching run, a guide route Mr (dotted line) which connects the field F1 with the field F2, as shown in FIG. 6A. Thus, the operator can perform a manual run operation (drive) following the guide route Mr, thus making it possible to easily perform the operation of teaching run.

The operator brings in the operation terminal 20 in the work vehicle 10, for example, and while checking the guide route Mr displayed at the operation terminal 20, causes the work vehicle 10 to manually run on the road R0 (see FIG. 3) from the field F1 to the field F2. The reception process unit 212 receives the run operation (manual steering) by the operator. On the teaching operation screen D2, the reception process unit 212 displays a current position image Mp in the position on the guide route Mr which position corresponds to the current position of the work vehicle 10.

The acquisition process unit 213, while the operator causing the work vehicle 10 to perform the teaching run on the road R0, acquires the position information of the work vehicle 10. Further, the acquisition process unit 213 acquires information on the run speed of the work vehicle 10 during the teaching run. Further, the acquisition process unit 213 may acquire the road R0's information during the teaching run (for example, an obstacle, a road surface state, a road width, a transient stop line, a speed limit, a traffic signal, etc.).

Figure 6B:
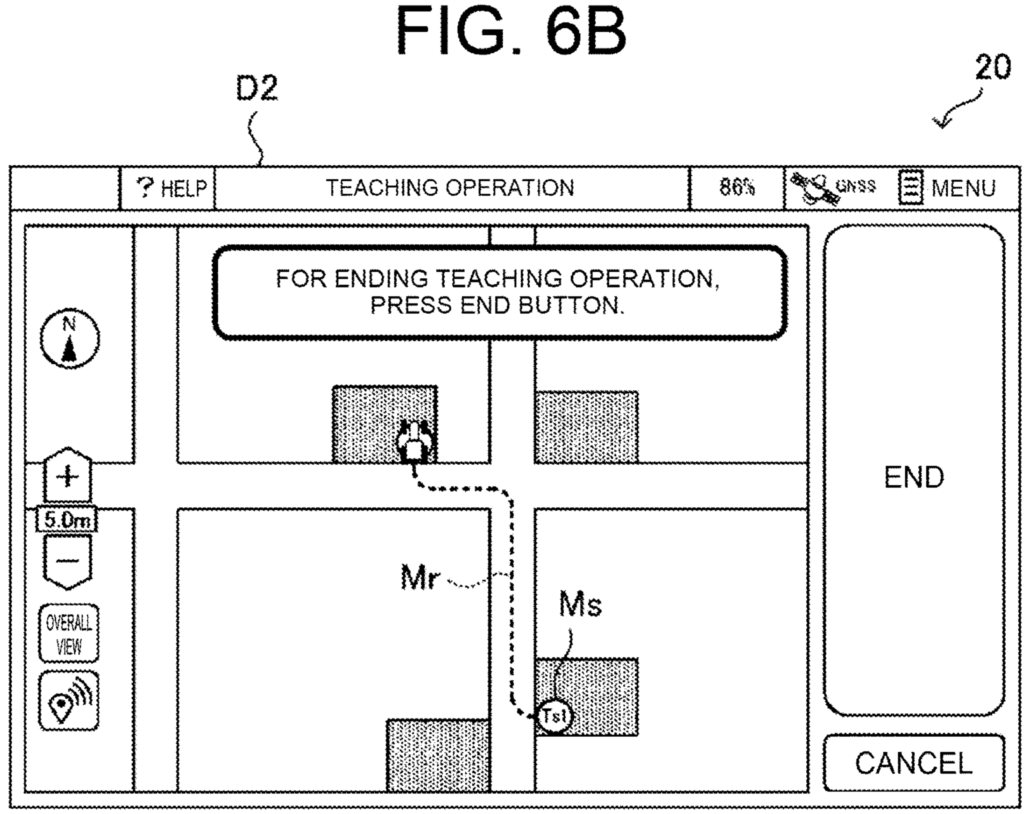
FIG. 6B is a diagram showing the example of the teaching operation screen displayed at the operation terminal according to the embodiment of the present invention.

When the operator drives the work vehicle 10 to the field F2 and thereby the work vehicle 10 arrives at the field F2, the operator presses down the end button on the teaching operation screen D2 (see FIG. 6B). When the operator presses down the end button, the reception process unit 212 receives an operation of ending the teaching run. The reception process unit 212, when having received the ending operation, sets a route end position Te2 in the field F2. The reception process unit 212 sets, as the route end position Te2, the work vehicle 10's current position at the time point of having received the ending operation, for example.

As another embodiment, the reception process unit 212, when receiving the ending operation from the operator in a state of the work vehicle 10 positioned in a given area in the field F2, may set the route end point Te2 in the field F2. Provided that the work vehicle 10 is positioned in an area of the entrance/exit H2 (see FIG. 4B) in the field F2, for example, the reception process unit 212 receives the ending operation by the operator and sets the route end position Te2 in the field F2. Contrary to the above; when the work vehicle 10 is positioned outside the field F2 or outside the area of the entrance/exit H2 in the field F2, the reception process unit 212, even when having received the ending operation by the operator, does not set the route end point Te2 in the field F2. In this case, the reception process unit 212 may make a notification of a message showing that the route end point Te2 is not settable, a message encouraging to move the work vehicle 10 into the area of the entrance/exit H2, or the like. According to this configuration, the end point of the inter-field route for moving between the fields can be set in a specific area (for example, the entrance/exit H2), thus making it possible to limit a position for moving from outside the field to inside the field.

Figure 6C:
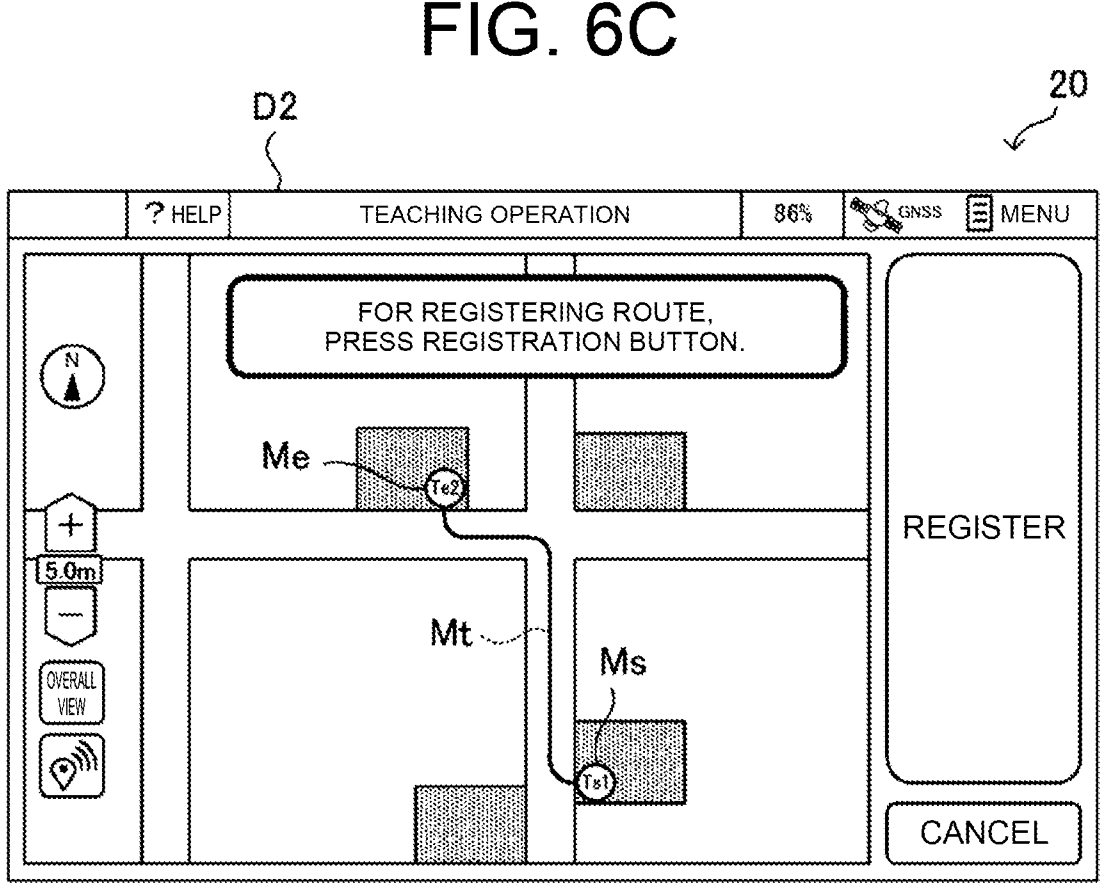
FIG. 6C is a diagram showing the example of the teaching operation screen displayed at the operation terminal the work vehicle according to the embodiment of the present invention.

Receiving the ending operation from the operator, the reception process unit 212 causes a route end position image Me, which shows the route end position Te2 in the entrance/exit H2 of the field F2, to be displayed on the map of the teaching operation screen D2 shown in FIG. 6C.

Figure 7:
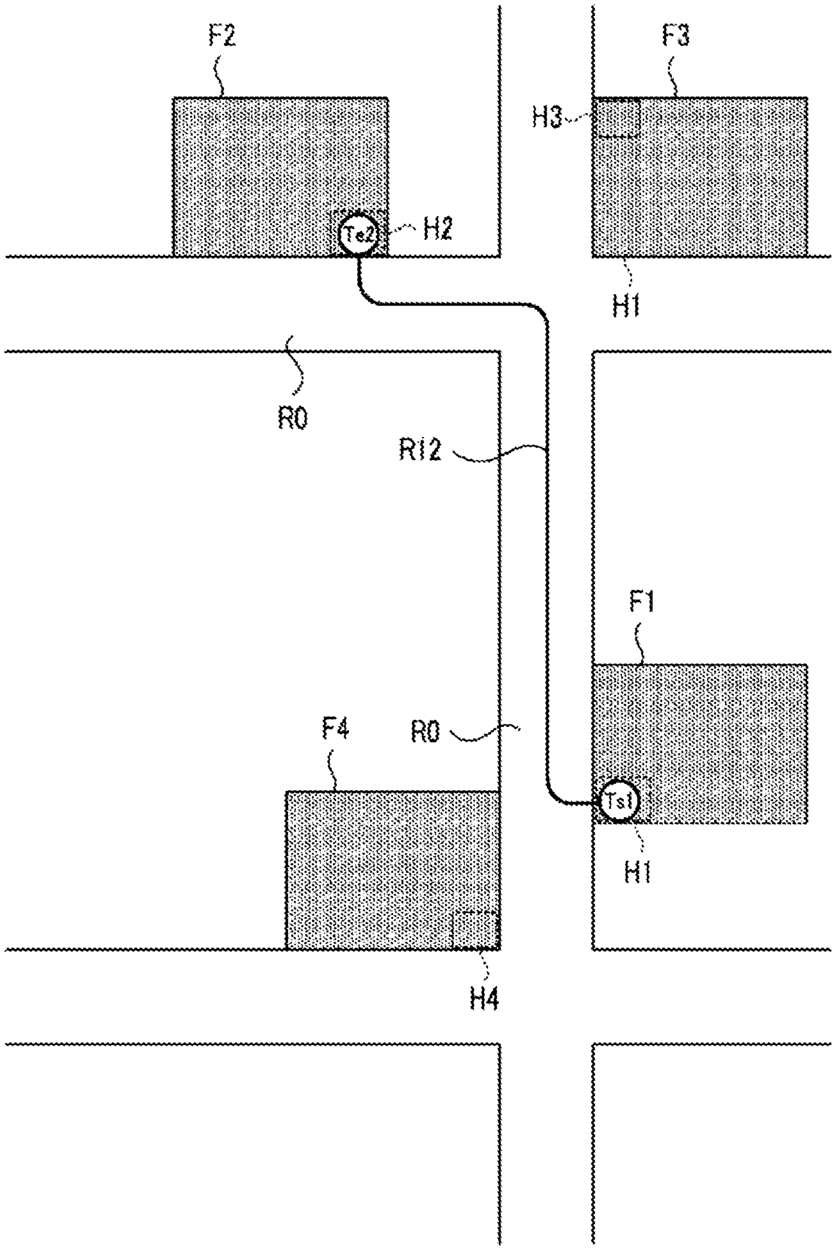
FIG. 7 is a diagram showing an example of the inter-field route of the work vehicle according to the embodiment of the present invention.

Further; when the reception process unit 212 receives the ending operation from the operator, the generation process unit 214, based on the work vehicle 10's position information acquired by the acquisition process unit 213, generates the inter-field route R12 for causing the work vehicle 10 to automatically run between the field F1 and the field F2. Specifically, the generation process unit 214, as shown in FIG. 7, generates the inter-field route R12 that connects the route start position Ts1 at the entrance/exit H1 of the field F1 with the route end position Te2 at the entrance/exit H2 of the field F2, and that passes through on the road R0. The generation process unit 214 causes a route image Mt (solid line) of the generated inter-field route R12 to be displayed on the map of the teaching operation screen D2 shown in FIG. 6C.

The generation process unit 214, on the teaching operation screen D2 shown in FIG. 6C, notifies the operator of whether or not to register the generated inter-field route R12. When the operator checks the inter-field route R12 on the teaching operation screen D2 and presses down the registration button, the generation process unit 214 acquires an instruction to register the inter-field route R12. The generation process unit 214, when acquiring the registration instruction, registers the inter-field route R12 in association with the field F1 and the field F2.

Figures 8, 9:
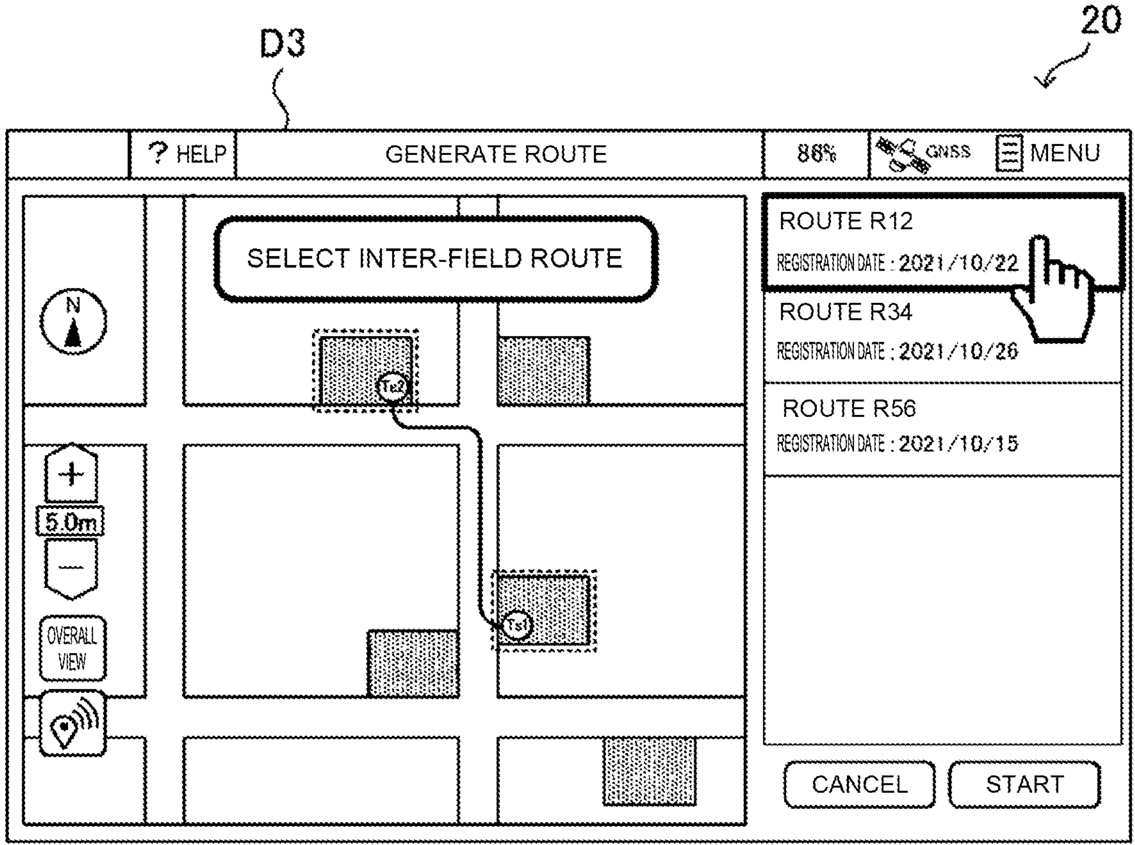
FIG. 8 is a diagram showing an example of an inter-field route information table according to the embodiment of the present invention.
FIG. 9 is a diagram showing an example of a route generation screen displayed at the operation terminal according to the embodiment of the present invention.

Specifically, the generation process unit 214 registers the inter-field route R12 in an inter-field route information table E1. FIG. 8 shows an example of the inter-field route information table E1. The inter-field route information table E1 includes a route ID, a start field, an end field, position information, speed information, and the like. The route ID is identification information of the inter-field route. The route ID "R001" shows the inter-field route R12. The start field is information showing the field that corresponds to the route start position of the inter-field route, and the end field is information showing the field that corresponds to the route end position of the inter-field route. The position information is information showing the position of the inter-field route, and information of the coordinate position acquired at a given period (sampling interval). The speed information is the work vehicle 10's run speed seen when the work vehicle 10 is caused to perform the teaching run on the inter-field route, and is information on the run speed for each coordinate position. Every time the operator selects plural fields thereby to perform the teaching operation, the generation process unit 214, registers, in the inter-field route information table E1, the generated inter-field routes in association with the field.

For causing the work vehicle 10 to start the automatic run, the operator selects the plural fields, and also selects, out of the inter-field routes registered in the inter-field route information table E1, the inter-field route for causing the work vehicle 10 to automatically run between the fields. When the operator selects the fields F1 and F2 on a route generation screen D3 shown in FIG. 9, for example, the operation control unit 21 causes a list of the inter-field routes, which are registered in the inter-field route information table E1, to be displayed, and receives, from the operator, the operation of selecting the inter-field route. Although omitted from the drawings, the operation control unit 21 receives, on the route generation screen D3, the operation of selecting the target route R1 in the field F1 (see FIG. 4A) and the target route R2 in the field F2 (see FIG. 4B).

Further, the operation control unit 21 determines whether or not the inter-field route connecting the field F1 with the field F2 is registered in the inter-field route information table E1; when the inter-field route is registered in the inter-field route information table E1, the operation control unit 21 causes the route generation screen D3 to display the inter-field route. Further; when receiving, from the operator, the operation of selecting the inter-field route, the setting process unit 211 sets the inter-field route for the work vehicle 10.

When the operator performs the operation of selecting the field F1 and the field F2, the operation of selecting the target route R1 in the field F1 and the target route R2 in the field F2, and the operation of selecting the inter-field route R12 for moving between the field F1 and the field F2, and then presses down the start button (see FIG. 9), the output process unit 215 outputs, to the work vehicle 10, the route data of the target routes and inter-field route. Note that when the operator selects the field F1 and the field F2, the operation control unit 21 may extract, from among the inter-field routes registered in the inter-field route information table E1, the inter-field route R12 that connects the field F1 with the field F2, and may set the above inter-field route R12. In this case, the operation, by the operator, to select the inter-field route can be omitted.

Here; to the work vehicle 10, the output process unit 215 outputs the route data including the target route R1 which is the work route in the field F1 (see FIG. 4A), the target route R2 which is the work route in the field F2 (see FIG. 4B), and the inter-field route R12 which is the inter-field route that connects the field F1 with the field F2 (see FIG. 7).

The work vehicle 10, when the route data of the target route generated at the operation terminal 20 is sent to the work vehicle stores the route data in the storage unit 12. The work vehicle while detecting the work vehicle 10's current position with the positioning antenna 164, performs the automatic run process based on the route data. Further, the current position of the work vehicle 10 usually matches the position of the positioning antenna 164.

Further, the work vehicle 10 is so configured as to be able to automatically run in the field F1 when the current position matches the run start position S1 in the field F1 (see FIG. 4A), and as to automatically run in the field F2 when the current position matches the run start position S2 in the field F2 (see FIG. 4B). Further, the work vehicle 10 is so configured as to be able to automatically run on the inter-field route R12 when the current position matches the route start position Ts1 at the entrance/exit H1 of the field F1 (see FIG. 7).

When the current position matches the run start position S1 in the field F1, the operator pressing down the start button on the operation screen (not shown) thereby to give the run start instruction to the work vehicle 10, for example, causes the work vehicle 10 to start the automatic run on the target route R1 by the run process unit 111 of the work vehicle 10.

The run process unit 111 causes the work vehicle 10, in the field F1, to automatically run from the run start position S1 to the run end position G1 following the target route R1 (see FIG. 4A). When the work vehicle 10 reaches the run end position G1, the operator causes the work vehicle 10 to move from the run end position G1 to the route start point Ts1. Further, the operation control unit 21 may generate a route (interpolation route) that causes the work vehicle 10 to automatically run from the run end position G1 to the route start position Ts1. In this case, the work vehicle 10, when reaching the run end position G1, automatically runs from the run end position G1 to the route start position Ts1 following the interpolation route.

When the current position of the work vehicle 10 matches the route start position Ts1, the run process unit 111 causes the work vehicle 10 to automatically run, following the inter-field route R12, from the route start position Ts1 to the route end position Te2 of the field F2 (see FIG. 7). Further, the vehicle control unit 11, for the work vehicle 10 to go out of the field F1 to the road R0, may cause the work vehicle 10 to transiently stop, thereby to require the operator for safety check.

The run process unit 111 causes the work vehicle 10 to automatically run based on the position information, the speed information, and the like which are associated with the inter-field route R12 (see FIG. 8). For example, the run process unit 111 sets, at the upper limit speed, the run speed that corresponds to the speed information (for example, run speed during the teaching run), and, while controlling the run speed of the work vehicle 10, causes the work vehicle 10 to automatically run. Further; when the work vehicle 10 detects the obstacle during the automatic run on the road R0, the run process unit 111 causes the work vehicle 10, while avoiding the obstacle, to automatically run following the inter-field route R12.

Further, the run process unit 111, for the work vehicle 10 to enter the field F2 from the road R0, causes the work vehicle 10 to transiently stop. When the work vehicle 10 reaches the route end point Te2, the operator causes the work vehicle 10 to move from the route end point Te2 to the run start position S2 in the field F2. Further, the operation control unit 21 may generate a route (interpolation route) that causes the work vehicle 10 to automatically run from the route end position Te2 to the run start position S2. In this case, the work vehicle 10, when reaching the route end position Te2, automatically runs from the route end position Te2 to the run start position S2 following the interpolation route.

When the current position of the work vehicle 10 matches the run start position S2, the run process unit 111 causes the work vehicle 10 to automatically run, following the target route R2, from the run start position S2 to the run end position G2 (see FIG. 4B). When the work vehicle 10 reaches the run end position G2, the run process unit 111 causes the work vehicle 10 to end the automatic run. As described above, the run process unit 111 causes the work vehicle 10 to automatically run in the field F1, then, causes the work vehicle 10 to automatically run on the inter-field route R12 from the field F1 to the field F2, and then causes the work vehicle 10 to automatically run in the field F2.

While the work vehicle 10 is automatically running, the operator can grasp, at the operation terminal 20, the run state in the field F1, the run state on the road R0 connecting the field F1 with the field F2, and the run state in the field F2.

As above, the operator can cause the work vehicle 10 to automatically run, following the inter-field route, between the plural fields.

[Report Process at Error Occurrence]

Here, the plural work vehicles 10, as the case may be, are caused to automatically run at the same time in plural fields and the inter-field route. In this case, the operator, the monitor, or the other user must at the same time monitor the plural work vehicles 10, making it difficult, when an error should occur to any of the work vehicles 10, for example, to grasp the work vehicle 10 with the error. Contrary to this, the automatic run system 1 according to the present embodiment enables the user to easily grasp, when the plurality of work vehicles 10 is automatically running, the work vehicle 10 to which the error has occurred, as shown below.

Figure 10:
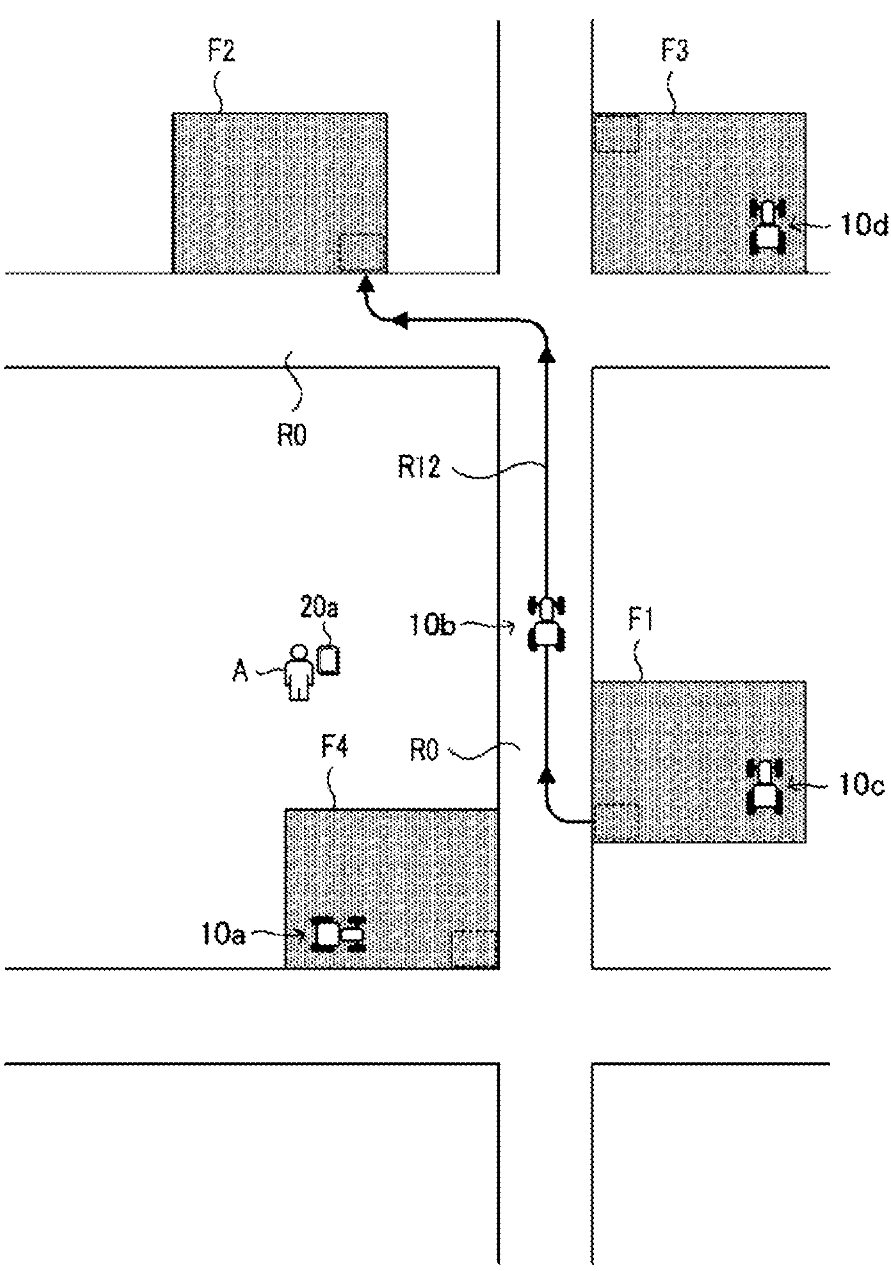
FIG. 10 is a diagram showing one example of a plurality of fields and an operation terminal according to an embodiment of the present invention.

For example, FIG. 10 shows four work vehicles 10*a* to 10*d* automatically running in the four fields F1 to F4 respectively. Here, an operation terminal 20*a* (an example of a second operation terminal of the present invention) possessed by an operator A in the fields F1 to F4 can communicate with each of the four work vehicles 10*a* to 10*d*, and the operator A, using the operation terminal 20*a*, can check the state of each of the work vehicles 10. For example, when the error should occur to the work vehicle 10*a*, the operator A can check the error of the work vehicle 10*a* by the operation terminal 20*a*. The following describes the specific configuration of the report process in the case of the error's having occurred to the work vehicle 10 in the automatic run system 1.

As shown in FIG. 1, the vehicle control unit 11 has a detection process unit 112 and a report process unit 113.

The detection process unit 112 detects the error of the work vehicle 10. For example, the detection process unit 112 detects the error of the work vehicle 10 when the door of the work vehicle 10 is opened, when the steering wheel, the shift lever, the accelerator, the brake, or other operation unit is manually operated, when the automatic run mode is switched to the manual run mode, when the vehicle deviates from the target route, when a third person boards the drive seat, when the engine 131 stops, when the radio wave strength decreases, when the positional accuracy decreases, or an obstacle is detected.

The report process unit 113, when the detection process unit 112 detects the error of the work vehicle 10, reports specific information on the work vehicle 10. Specifically, the report process unit 113, when the error of the work vehicle 10 is detected, reports the specific information on the work vehicle 10 to the operation terminal 20 communicable with the work vehicle 10.

For example, in the example shown in FIG. 10; when the door of the work vehicle 10*a* is opened during the work vehicle 10*a*'s automatically running in the field F4, the detection process unit 112 detects the error of the work vehicle 10*a*. For example, when a detection unit such as a door sensor installed on the work vehicle 10*a* detects the opening of the door, the detection process unit 112 detects the opening of the door based on the detection signal acquired from the door sensor. The detection process unit 112, when having detected the opening of the door, determines that the error has occurred to the work vehicle 10*a*. The detection process unit 112 detects the opening of the door so as to prevent the work vehicle 10*a* from being stolen by a third party (intruder), for example.

For example, the operator A, as the case may be, opens the door so as to board the work vehicle 10*a*. This case is not the error of the work vehicle 10*a*; thus, the detection process unit 112 does not detect the error of the work vehicle 10*a*. Specifically, the detection process unit 112, when having detected the opening of the door while the work vehicle 10*a* is set to the automatic run mode, detects the error of the work vehicle 10*a*. Further; when the operator A (operation terminal 20*a*) is positioned at less than a given distance from the work vehicle 10*a*, the operator A can visually check the work vehicle 10*a*. Thus, the detection process unit 112, when having detected the opening of the door while the operation terminal 20*a* is positioned at less than the given distance from the work vehicle 10*a*, does not detect the error of the work vehicle 10*a*. Contrary to this, the detection process unit 112, when having detected the opening of the door while the operation terminal 20*a* is positioned at more than or equal to the given distance from the work vehicle 10*a*, detects the error of the work vehicle 10*a*.

As another embodiment; when the work vehicle 10 is provided with a function to authenticate the user (authentication by a communication tag, a biometric authentication, etc.), the detection process unit 112 may be so configured as not to detect an error when a preliminarily registered user opens the door, but to detect an error when the third party not preliminarily registered opens the door.

Figure 11:
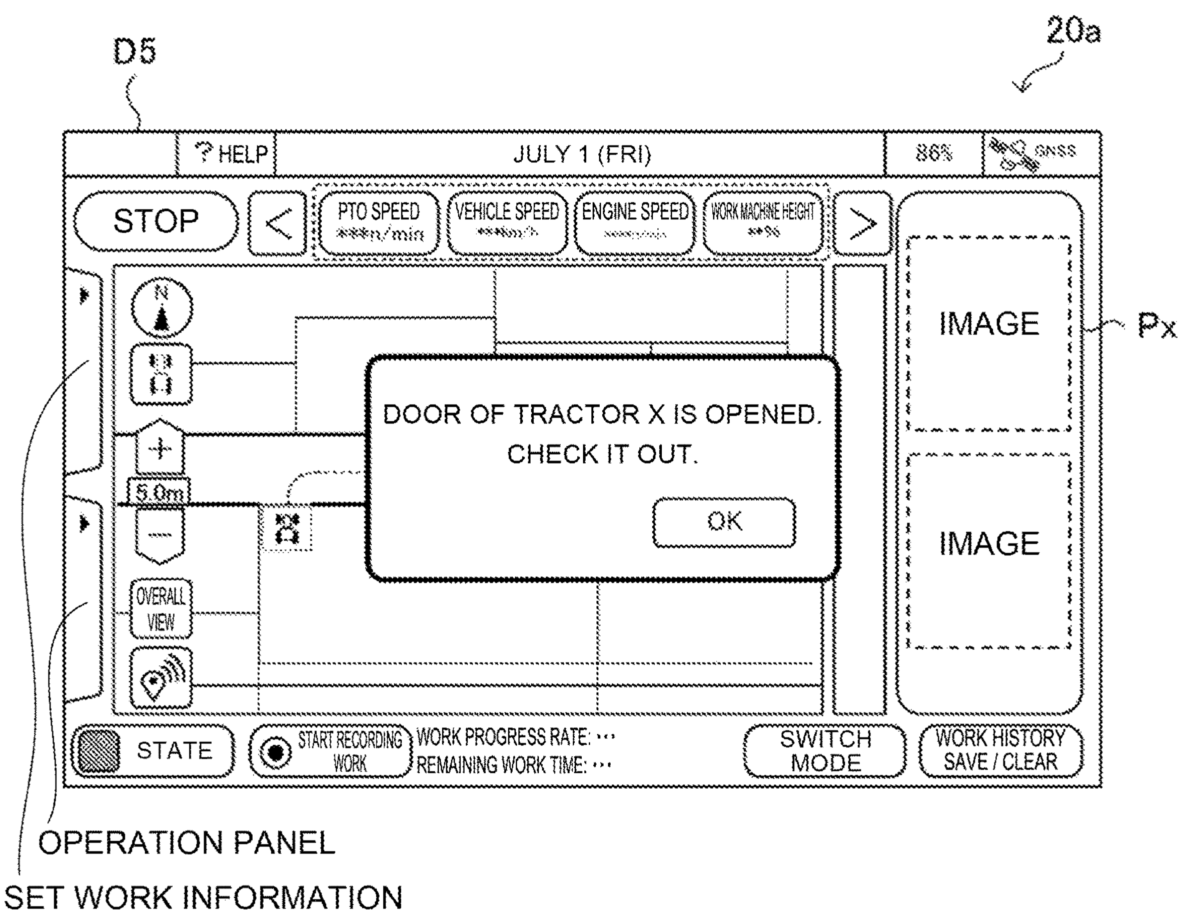
FIG. 11 is a diagram showing an example of a run screen displayed at the operation terminal according to the embodiment of the present invention.

The report process unit 113, when having detected the error of the work vehicle 10*a*, causes the operation terminal 20*a* to report specific information on the work vehicle 10*a*. Specifically, as shown in FIG. 11, the report process unit 113, on a run screen D5 of the operation terminal 20*a*, displays a message that the door of the work vehicle 10*a* (tractor X) has been opened. Further, the report process unit 113 may cause the message to be audibly output from the operation terminal 20*a*.

Further, the report process unit 113 may cause the run screen D5 to display a captured image Px captured by a camera installed on the work vehicle 10*a*. For example, the captured image Px may include an image of the surrounding of the work vehicle 10*a*, an image captured inside the cabin 138, etc.

Thus, the specific information includes identification information that identifies the work vehicle 10 to which the error occurred ("tractor X" in FIG. 11) and error information on the error ("door was opened" in FIG. 11). This allows the operator A to grasp the work vehicle 10*a* which is of the plural work vehicles 10 and to which the error is occurring, and to grasp that the door of work vehicle 10*a* has been opened. Further, the report process unit 113 may perform either any one of or both of the display process and audio output process of the message. The operator A, after checking the message, moves to the position of the work vehicle 10*a*, for example, visually checks for any error, and presses down an "OK" (check) button on the run screen D5. Further, the report process unit 113, when the "OK" button operation is not received from the operator A within a given time after the displaying of the message, may cause the message to be audibly output.

Further, the report process unit 113 may be so configured as to cause the specific information to be reported when the operation terminal 20 is positioned at a given distance or more from the work vehicle 10, and as not to cause the specific information to be reported when the operation terminal 20 is positioned at less than the given distance from the work vehicle 10. With this; when the operator A can visually check the work vehicle 10, the process of reporting the specific information is omitted, making it possible to avoid the hassle of an unnecessary reporting process.

Figure 12:
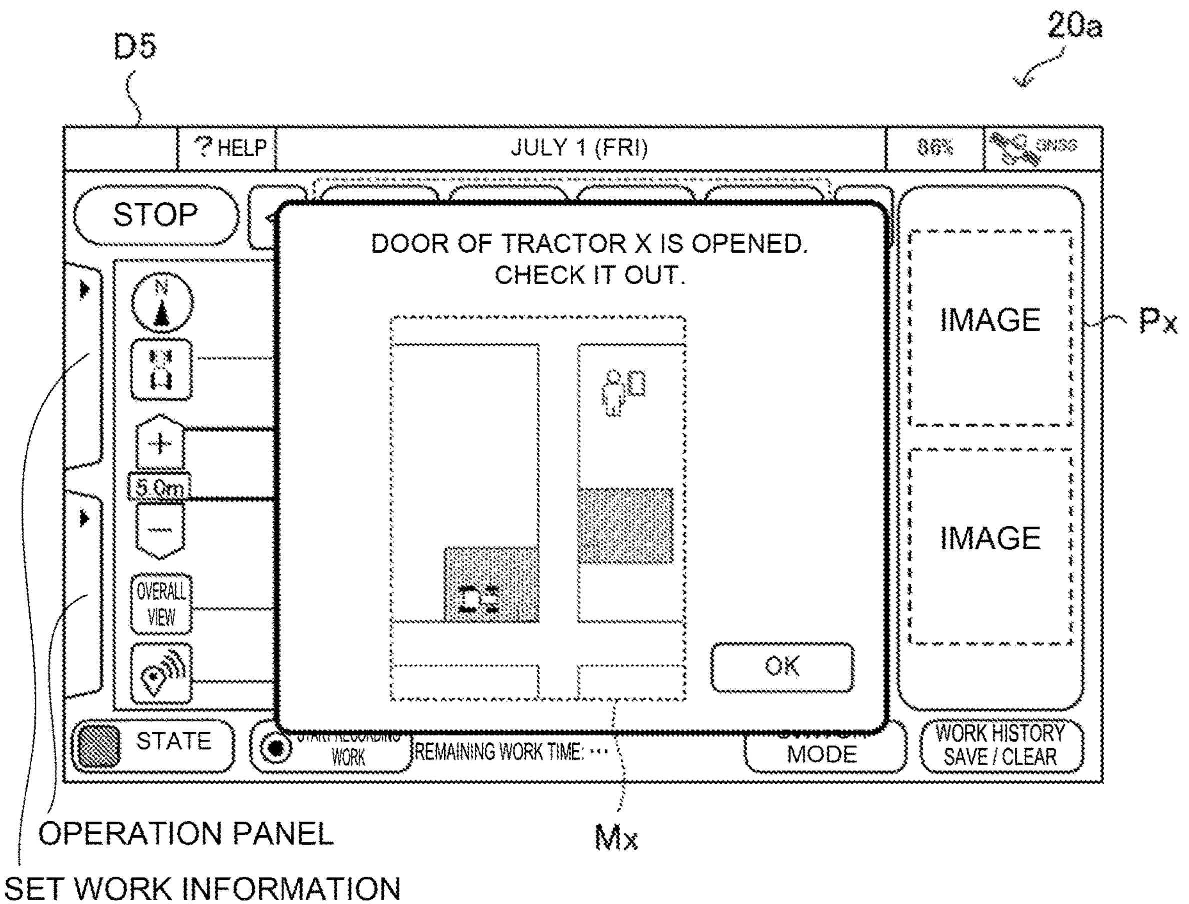
FIG. 12 is a diagram showing an example of the run screen displayed at the operation terminal according to the embodiment of the present invention.

As another embodiment, the report process unit 113 may cause the specific information of a content, which corresponds to the distance from the work vehicle 10*a* to the operation terminal 20*a*, to be reported at the operation terminal 20*a*. For example; when the operator A is positioned close to the work vehicle 10*a* (less than the given distance) at the time point of having detected the error of the work vehicle 10*a*, the operator A can visually check the work vehicle 10*a*. In this case, the report process unit 113 displays a message showing that the error has been detected, as shown in FIG. 11. Contrary to this; when the operator A is positioned far from the work vehicle 10*a* (more than or equal to the given distance) at the time point of having detected the error of the work vehicle 10*a*, the operator A cannot visually check the work vehicle 10*a*. In this case, the report process unit 113, as shown in FIG. 12, displays position information Mx (positional relation) of the operation terminal 20*a* relative to the work vehicle 10*a* in addition to a message showing that the error has been detected. Further, the report process unit 113 may cause the position information Mx to be audibly output from the operation terminal 20*a*.

Another example concerning the error of the work vehicle 10 is, for example, a decrease in the strength of a radio wave (radio wave strength) the operation terminal 20*a* receives from the work vehicle 10. Decrease in the radio wave strength makes it difficult for the operation terminal 20*a* to instruct for the run of the work vehicle 10 or to check the run state of the work vehicle 10. Then, the detection process unit 112, when having detected the work vehicle 10 that is among the plural work vehicles 10 and that has the radio wave strength less than the threshold value, determines that the error has occurred to the work vehicle 10.

Figure 13:
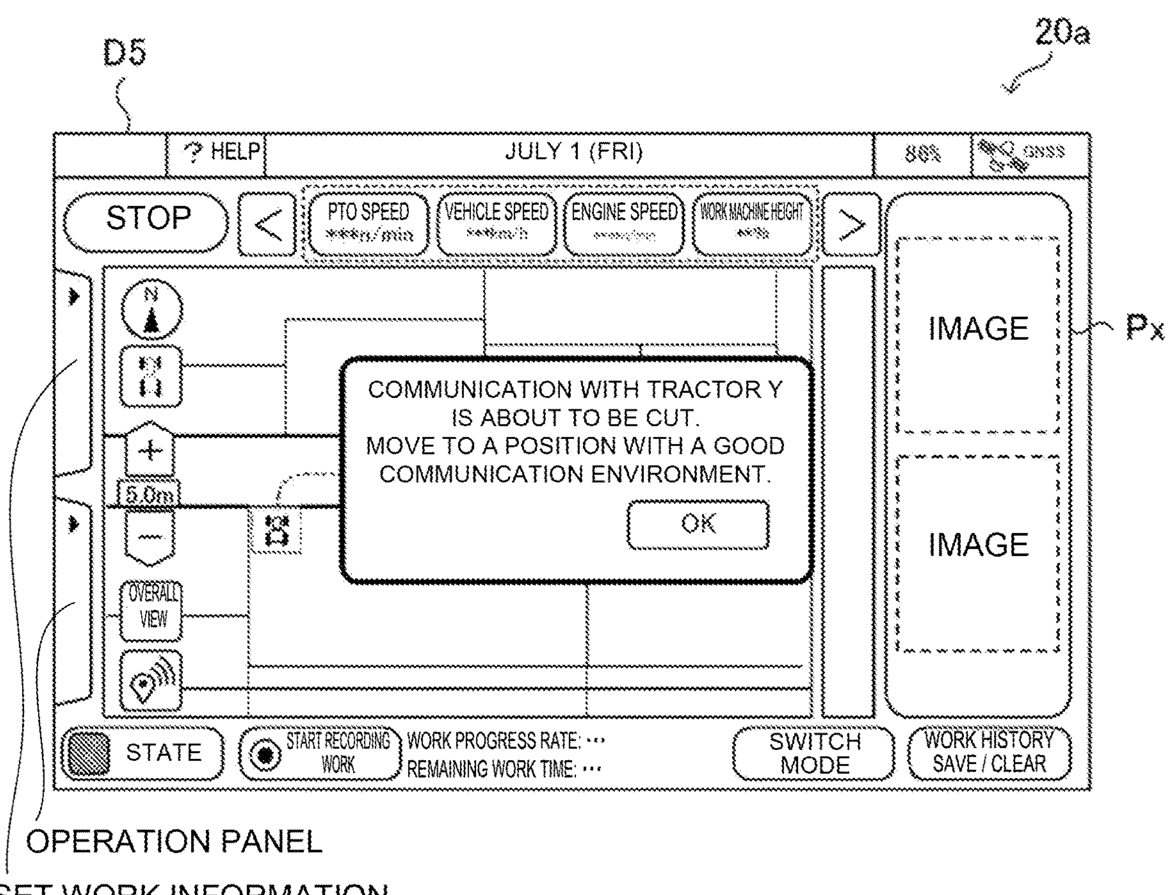
FIG. 13 is a diagram showing an example of the run screen displayed at the operation terminal according to the embodiment of the present invention.

For example, in the example shown in FIG. 10; when the operation terminal 20*a* is positioned far from the work vehicle (tractor Y) in the field F3 and the radio wave strength is below the threshold value, the detection process unit 112 detects the error of the work vehicle 10*d*. In this case, as shown in FIG. 13, for example, the report process unit 113 causes the run screen D5 of the operation terminal 20*a* to display a message that the communication with the work vehicle 10*d* (tractor Y) is about to be lost and a message urging the operator to move to a position with a good communication environment. Further, the report process unit 113 may cause the message to be audibly output from the operation terminal 20*a*.

As another embodiment, the report process unit 113, when the position of the operation terminal 20*a* does not move within a given time after the message shown in FIG. 13 is displayed, or when the radio wave strength fails to be the threshold value or over within a given time, may further cause the message to be audibly output from the operation terminal 20*a*.

Further, the message, which is shown in FIG. 13 and which urges the user to move to the position with a good communication environment, is information to act against the fact that the radio wave strength of the work vehicle 10*a* has decreased, that is, an example of action information of the present invention. That is, the report process unit 113, when the error of the work vehicle 10 has been detected, may cause the action information on the error to be reported at the operation terminal 20.

Figure 14:
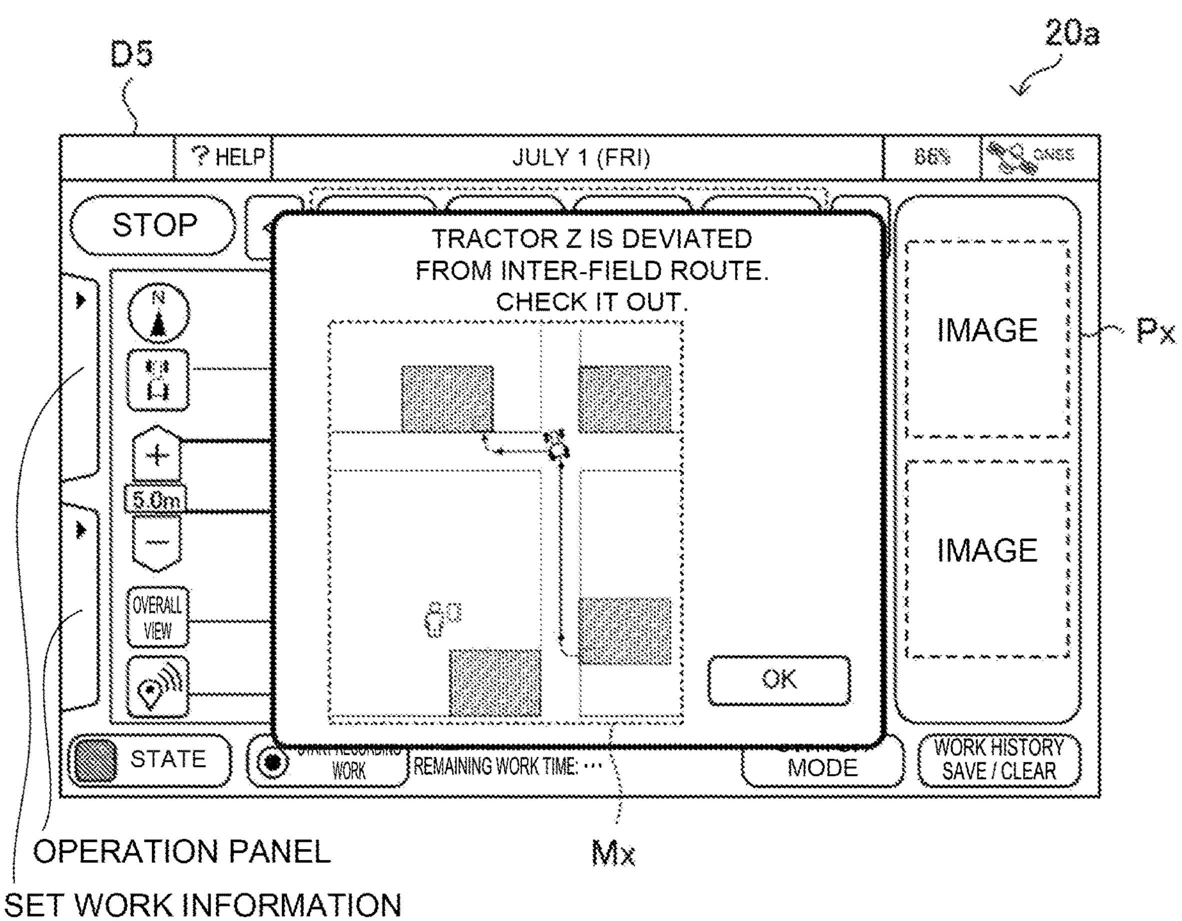
FIG. 14 is a diagram showing an example of the run screen displayed at the operation terminal according to the embodiment of the present invention.

Another example concerning the error of the work vehicle 10 is a deviation of the work vehicle 10*b*, which automatically runs on the road R0 following the inter-field route R12, which deviation is from the inter-field route R12. When the work vehicle 10 automatically runs on the road R0, the operator is more likely to be in a position that prevents visual checking of the work vehicle 10. Further; when the work vehicle 10 while automatically running on the road R0 deviates from the inter-field route R12, there is caused a risk of contact with another vehicle, a theft, etc. Thus, the detection process unit 112, when the work vehicle 10*b* that automatically runs on the road R0 deviates from the inter-field route R12, determines that the error has occurred to work vehicle 10*b*. In this case, as shown in FIG. 14, for example, the report process unit 113 causes the run screen D5 of the operation terminal 20*a* to display a message that the work vehicle 10*b* (tractor Z) has deviated from the inter-field route R12, and the position information Mx (position relation) of the operation terminal 20*a* relative to the work vehicle 10*b*. Further, the report process unit 113 may cause the message and the position information to be audibly output from the operation terminal 20*a*.

Further, as another embodiment; when the detection process unit 112 has detected the error of the work vehicle 10, the report process unit 113 may cause the operation terminal 20 to report information on the field to be worked on by the work vehicle 10 to which the error is occurring (such as the position and name of the field).

Figure 15:
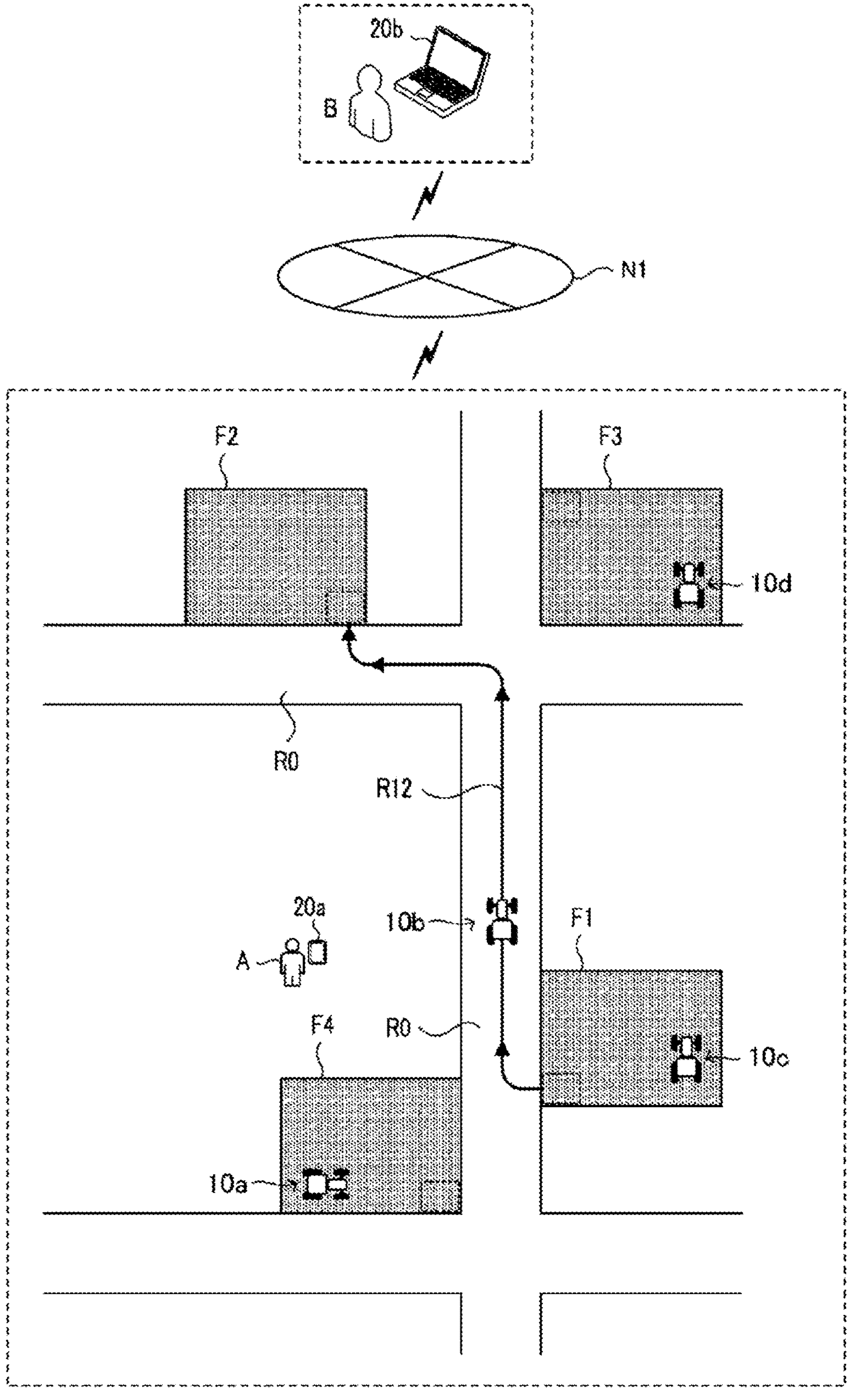
FIG. 15 shows the relation between the plurality of work vehicles and the remote operation terminal.

By the way, the operation terminal 20 may be used in the field or in a remote position outside the field. For example, as shown in FIG. 15, the operator A, using the operation terminal 20*a*, monitors the work vehicles 10*a* to 10*d* in a position of allowing movement to the fields F1 to F4, and a monitor B, using an operation terminal 20*b* (an example of the first operation terminal of the invention), remotely monitors the work vehicles 10*a* to 10*d* at a remote position away from the fields F1 to F4. For example, the operation terminal 20*a*, by a short-distance and medium-distance (e.g., within 50 m) wireless communication method (hereinafter referred to as a short-distance communication method) (an example of a second communication method of the present invention), can communicate with each of the work vehicles 10*a* to 10*d*, and the operation terminal 20*b*, by a long-distance wireless communication method (hereinafter referred to as a long-distance communication method) (an example of a first communication method of the present invention) that can connect to the Internet, for example, can communicate with each of the work vehicles 10*a* to 10*d*. Each of the operation terminals 20 may be so configured as to switch between the short-distance and long-distance communication methods thereby to communicate with the work vehicle 10.

In the above configuration, the report process unit 113, when the operation terminal 20*b* is communicable by the long-distance communication method, causes first specific information to be reported at the operation terminal 20*b*, and, when the operation terminal 20*a* is communicable by the short-distance communication method, causes second specific information, which is different from the first specific information, to be reported at the operation terminal 20*a*. Specifically, the first specific information includes identification information, which identifies the work vehicle 10 in which the error has been detected, and error information on the error, and the second specific information includes the identification information, which identifies the work vehicle 10 in which the error has been detected, the error information on the error, and action information on how to act against the error.

That is; when the error has occurred to the work vehicle 10, the remote monitor B is notified that the error has occurred, and the operator A in the field is notified that the error has occurred as well as the action information against the error. The action information is, for example, information that, when the door of the work vehicle 10*a* has been opened, urges to move to the position of the work vehicle 10*a* or urges to close the door, or information that, when the radio wave strength of the work vehicle 10*a* is below the threshold value, urges to move to the position with a good communication environment.

Further, the report process unit 113, when the error of the work vehicle 10*a* has been detected, for example, may cause each of the operation terminals 20*a* and 20*b* to report the specific information, and when, at the operation terminal 20*b*, receiving, from the user (monitor B), a given instruction for the specific information, may further cause the given information to be reported at the operation terminal 20*a*.

Figure 16:
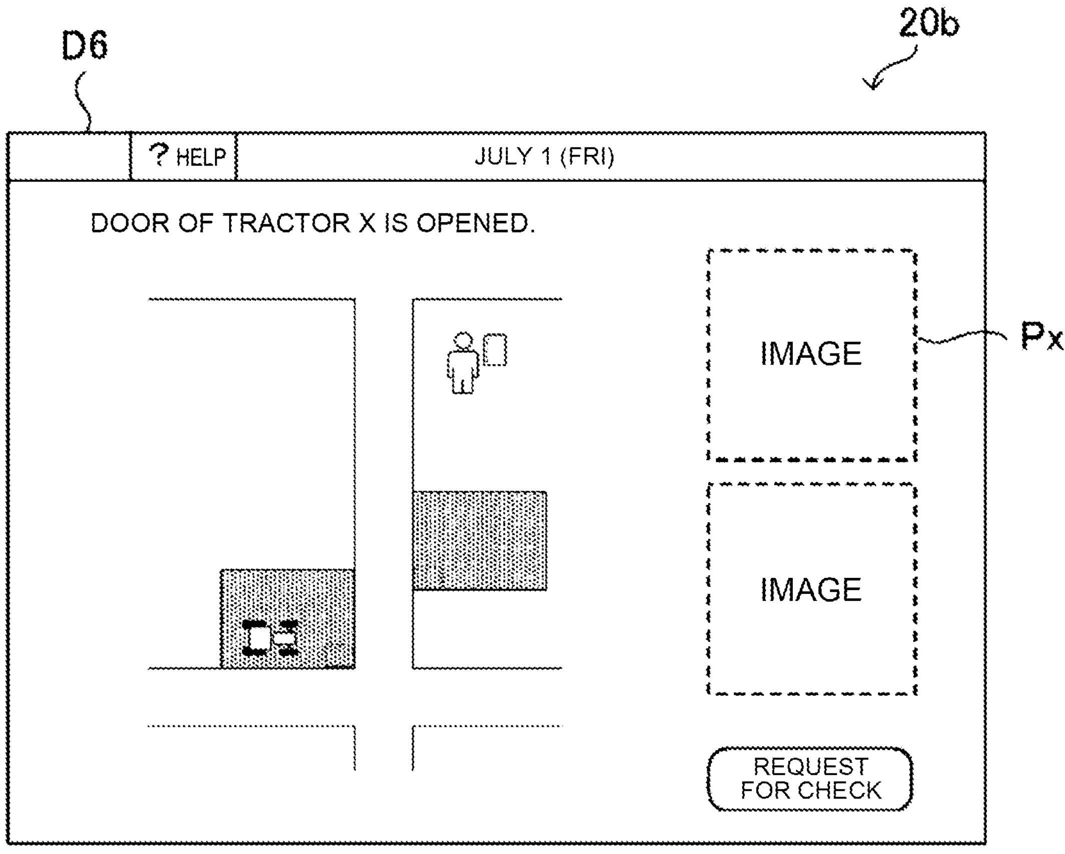
FIG. 16 is a diagram showing an example of a monitor screen displayed at the operation terminal according to the embodiment of the present invention.

When the detection process unit 112 has detected that the door of the work vehicle 10*a* has been opened, for example, the report process unit 113, causes each of the operation terminals 20*a* and 20*b* to display and audibly output a message to the effect that the door of the work vehicle 10*a* has been opened. Further, the report process unit 113, as shown in FIG. 16, causes a monitor screen D6 of the operation terminal 20*b* of the monitor B to display a check request button. When the check request button is pressed down by the monitor B (an example of a given instruction), the report process unit 113 causes the run screen D5 of the operation terminal 20*b* of the operator A to display and audibly output a message (an example of given information) that gives an instruction to check the work vehicle 10*a*. Thus, when the error has occurred to the work vehicle 10, the report process unit 113, according to the remote monitor's instruction, notifies the operator in the field of the instruction to check for the error of the work vehicle 10.

As another embodiment, the report process unit 113 may cause specific information of a content, which corresponds to the work state of the user (operator, monitor, etc.) of the operation terminal 20, to be reported. It is deemed that when the operator A is working boarding another work vehicle 10 at the time of the error's having occurred to the work vehicle 10*a*, for example, the operator A may not notice the specific information displayed on the operation terminal 20*a*. Meanwhile, when the operator A is operating the operation terminal 20*a* at the time of the error's having occurred to the work vehicle 10*a*, the operator A can immediately notice the specific information displayed on the operation terminal 20*a*. Thus, the ease with which the operator can recognize the error of the work vehicle 10 corresponds to the work state.

Then, the report process unit 113, when the operator is operating (e.g., driving) the work vehicle 10, for example, causes the operation terminal 20 to audibly output the specific information, and, when the operator is operating the operation terminal 20, causes the operation terminal 20 to display the specific information. Further, the report process unit 113 may adjust the volume of the audio output depending on the operator's operation of the work vehicle 10, for example, increasing the volume of the audio output when the operator is manually driving the work vehicle 10.

As another embodiment, the report process unit 113 may vary the method of reporting the specific information when the error of the work vehicle 10 is detected in the field from the method of reporting the specific information when the error of the work vehicle 10 is detected in the inter-field route. When the error has occurred to the work vehicle 10 in the field, for example, the operator in the field can quickly take an action to the error. Contrary to this, when the error has occurred to the work vehicle 10 on the inter-field route, for example, it is difficult for the operator in the field to quickly take an action to the error. When the door of the work vehicle 10 that is automatically running the an inter-field route is opened, for example, the operator A, as the case may be, cannot immediately move to the work vehicle despite the risk of theft being higher. Thus, the urgency level for the error corresponds to the work vehicle 10's position seen when the error has occurred in the work vehicle 10.

Then, the report process unit 113 may vary the content of the specific information depending on the work vehicle 10's position seen when the error has occurred to the work vehicle 10. The report process unit 113, when the error of the work vehicle 10 is detected in the field, for example, causes the operation terminal 10 of the operator closest to the work vehicle 10 to report the specific information. Contrary to this, the report process unit 113, when the error of the work vehicle 10 is detected on the inter-field route, causes each of the operation terminals 20 of the plural operators around the work vehicle 10 and the operation terminal 20 of the remote monitor to report the specific information. Further, the report process unit 113, when the error of the work vehicle 10 has been detected on the inter-field route, may cause the operation terminal 20, which is of the operator positioned on the proceeding direction side of the work vehicle 10 on the inter-field route, to report the specified information.

[Automatic Run Process]

Figure 17:
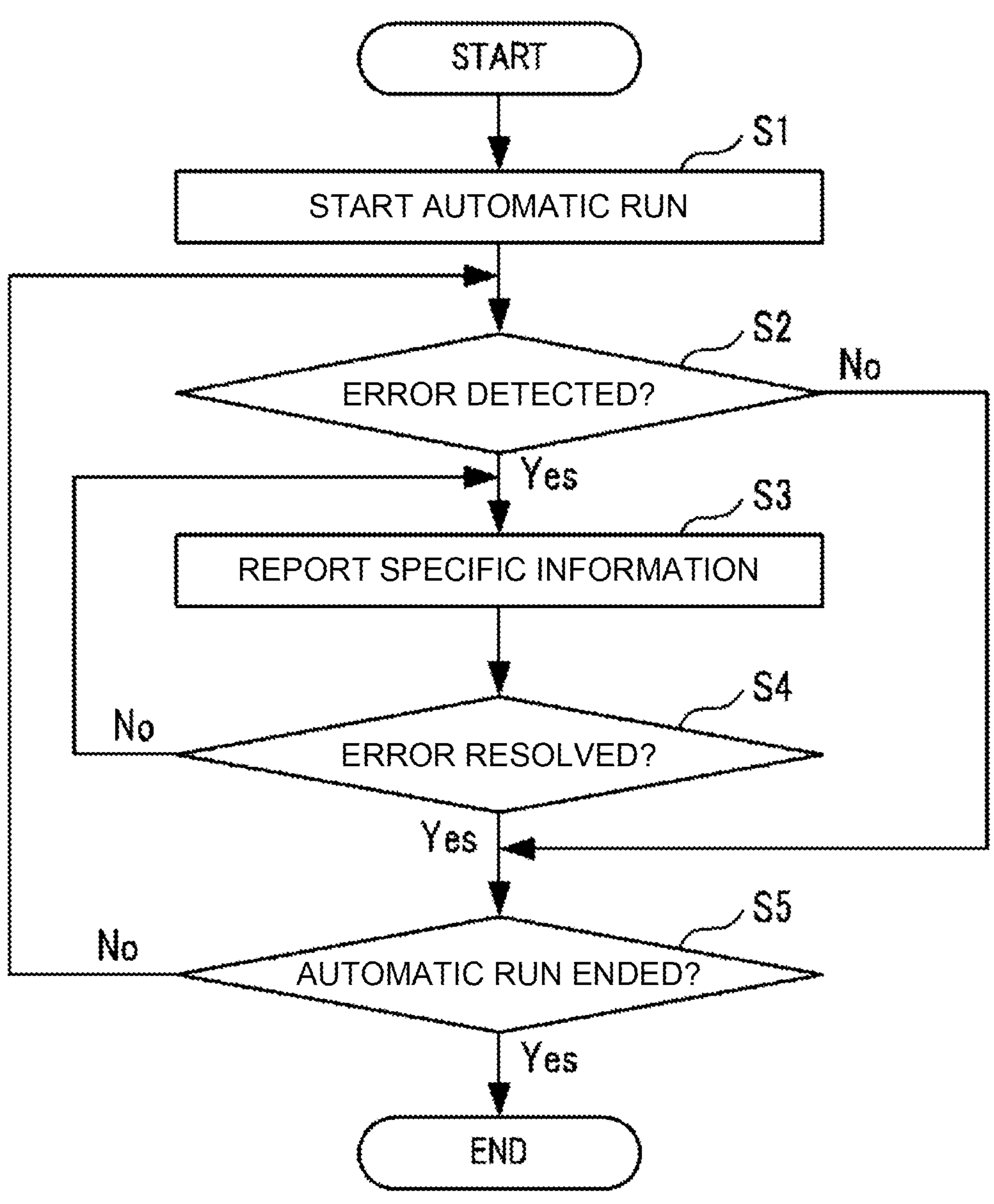
FIG. 17 is a flowchart showing an example of a procedure of an automatic run process performed by the automatic run system according to the embodiment of the present invention.

An example of the automatic run process performed by the automatic run system 1 is to be described below with reference to FIG. 17.

Further, the present invention may be regarded as an invention of an automatic run method that performs one or more steps included in the automatic run process. Further, the one or more steps included in the automatic run process described herein may be properly omitted. Note that each step in the above automatic run process may be performed in a different order as long as the same functional effect is caused. Further, although a case where the vehicle control unit 11 performs each step in the automatic run process is described as an example, an automatic run method in which one or more processors perform each of the steps in the automatic run process in a distributed manner is also deemed as another embodiment.

Here, as shown in FIG. 10, a case of the four work vehicles 10*a* to 10*d* automatically running on the road R0 that connects with the fields F1 to F4 and between the fields is raised as an example for description.

At step S1, the vehicle control unit 11 of each of the work vehicles 10 causes the work vehicle 10 to start the automatic run. Each of the work vehicles 10 automatically runs following the target route in the field. Further, each of the work vehicles 10 automatically runs on the road R0 following the inter-field route.

At step S2, the vehicle control unit 11 determines whether or not the error of the work vehicle 10 has been detected. For example, the vehicle control unit 11 of each of the work vehicles 10, when the door of the work vehicle 10 is opened, when the operation unit (steering wheel, shift lever, accelerator, brake, etc.) is manually operated, when the automatic run mode is switched to the manual run mode, when the vehicle deviates from the target route, when the third person boards the drive seat, when the engine 131 stops, when the radio wave strength decreases, when the positioning accuracy decreases, and when the obstacle is detected, determines that the error has occurred to the work vehicle 10. The vehicle control unit 11, when detecting the error of the work vehicle 10 (S2: Yes), moves the process to step S3. Meanwhile, the vehicle control unit 11, when not detecting the error of the work vehicle 10 (S2: No), moves the process to step S5.

In step S3, the vehicle control unit 11 causes the operation terminal 20 to report the specific information on the work vehicle 10 from which the error has been detected. The vehicle control unit 11, when having detected that the door of the work vehicle 10*a* working in the field F1 was opened, for example, causes the run screen D5 of the operation terminal 20*a* of the operator A to display and audibly output the message that the door of the work vehicle 10*a* (tractor X) has been opened (see FIG. 11 and FIG. 12). Further, the vehicle control unit 11 may cause the work vehicle 10 to audibly output the message.

Further, the vehicle control unit 11 may cause the operation terminal 20*b* of the remote monitor B to display the message (see FIGS. 15 and 16).

The operator A, after checking the message, moves to the position of the work vehicle 10*a* and visually checks for any error. The operator A performs the operation to resolve the error, for example, closing the opened door, and presses down the "OK" (check) button on the run screen D5 (see FIGS. 11 and 12).

Next, in step S4, the vehicle control unit 11 determines whether or not the error of the work vehicle 10*a* has been resolved. The vehicle control unit 11, when acquiring, from the operation terminal 20, information showing that the "OK" button has been pressed down thereby to detect that the door has been closed, for example, determines that the error of the work vehicle 10*a* has been resolved. The vehicle control unit 11, when the error of the work vehicle 10*a* is resolved (S4: Yes), moves the process to step S5. Meanwhile, the vehicle control unit 11, when the error of the work vehicle 10*a* has not been resolved (S4: No), moves the process to step S3 thereby to continue the report process.

Further, the vehicle control unit 11, when the error is not resolved within a given time after the message being caused to be reported at the operation terminal 20, may cause the message to be audibly output, or the message may be reported at the operation terminal 20 of another operator or monitor.

Further, as another embodiment; each of the vehicle control units 11 of the work vehicles 10 (here, work vehicles 10*b* to 10*d*) in which no error has occurred, when the error should occur to another work vehicle 10 (here, work vehicle 10*a*), may perform a run control process, such as stopping its own vehicle's automatic run, slowing down the vehicle speed, changing the run route.

Next, in step S5, the vehicle control unit 11 determines whether or not the work vehicle 10 has ended the automatic run. When the work vehicle 10 has ended the target work in the field, the vehicle control unit 11 causes the work vehicle 10 to end the automatic run (S5: Yes). The vehicle control unit 11, until the work vehicle 10 ends the automatic run, repeats the processes of steps S2 to S4 (S5: No).

As described above, the automatic run system 1 according to the present embodiment causes each of the plural work vehicles 10 to automatically run in the field (work area), and, causes, when having detected the error of at least any of the plural work vehicles 10, and having detected the error of the work vehicle 10*a* among the plural work vehicles 10, the specific information on the work vehicle 10*a* to be reported at the operation terminal 20 communicable with each of the plural work vehicles 10.

According to the above configuration, the user can easily grasp, when the plurality of work vehicles 10 is automatically running, the work vehicle 10 to which the error has occurred. Further, for example, the user remotely monitoring can immediately grasp that the error has occurred to the work vehicle 10.

[Setting of Closed Area]

According to the present embodiment, the operator can cause the work vehicle 10 to automatically run, following the inter-field route, between the plural fields. Here, for causing the work vehicle 10 to automatically run on the inter-field route, attention needs to be paid to the safety of the road R0 for preventing the work vehicle 10 from coming into contact with another vehicle or the like. For causing the plural work vehicles 10 to automatically run on the road R0, in particular, it becomes difficult to secure safety while preventing a decrease in running efficiency. Contrary to the above, the automatic run system 1 according to the present embodiment can cause the work vehicle 10 to automatically run between the plural fields with safety and a good efficiency, as described below.

Figure 18:
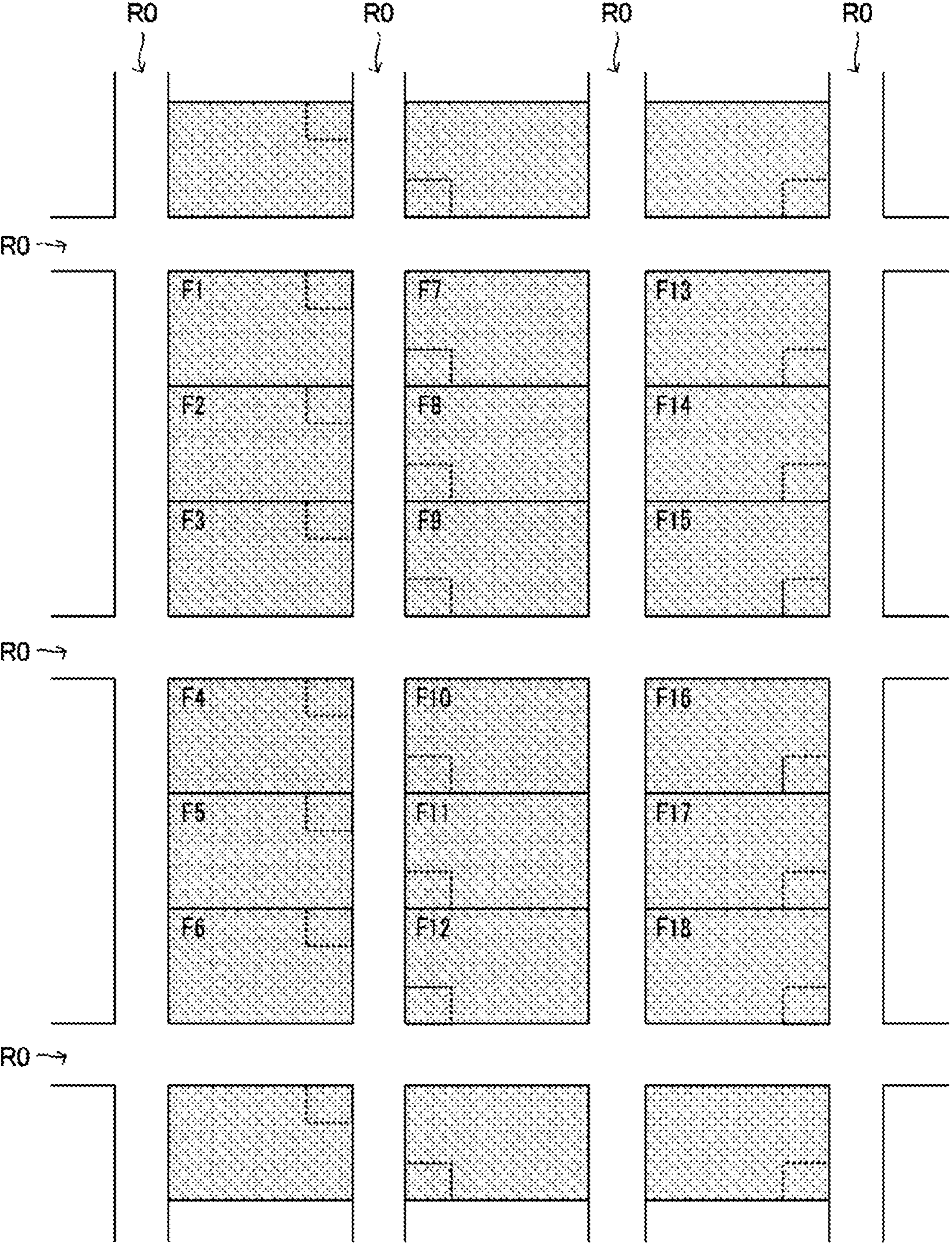
FIG. 18 is a diagram showing an example of a map and the field according to the embodiment of the present invention.

FIG. 18 shows an example of a map including the plural fields. The plural fields are zoned by the road R0. In the example shown in FIG. 18, the plural work vehicles 10, as the case may be, work in the fields F1 to F12 and move between the fields, for example. Thus, in the case of the plural work vehicles 10 moving between the plural fields, controlling the inter-field route and run of the plurality of work vehicles 10 can prevent a contact among the plural work vehicles 10; a third party's vehicle or the like other than the plural work vehicles 10, if running on the road R0 between the fields F1 and F12, however, causes a concern of reducing safety of the runs of the plural work vehicles 10.

Then, the setting process unit 211 of the operation control unit 21 sets a given range, which includes a plurality of fields which are the work target, as an automatic run permission area AR1 (closed area) that permits the automatic run of the work vehicle 10. Specifically, the setting process unit 211 sets, as the automatic run permission area AR1, the given range including a plurality of fields and the road R0 for entering each of the plural fields. The automatic run system 1 sets the automatic run permission area AR1 and restricts the third party's entering the automatic run permission area AR1, thereby making it possible to cause the work vehicle 10 to automatically run with safety in the automatic run permission area AR1.

Figure 19:
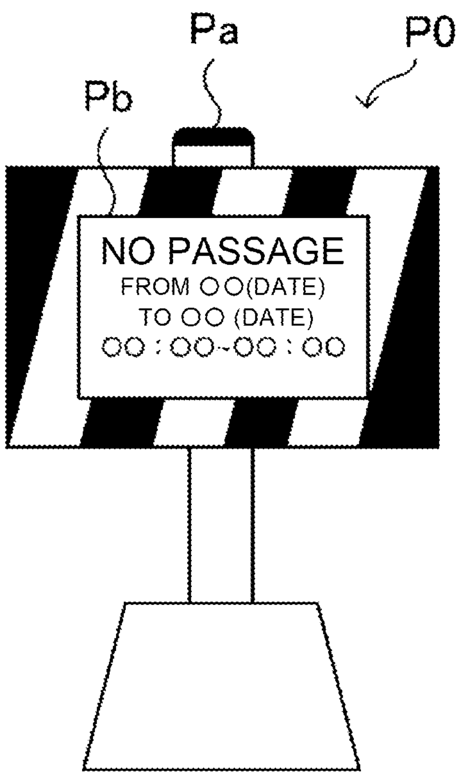
FIG. 19 is a diagram showing an example of a sign according to the embodiment of the present invention.
Figure 20:
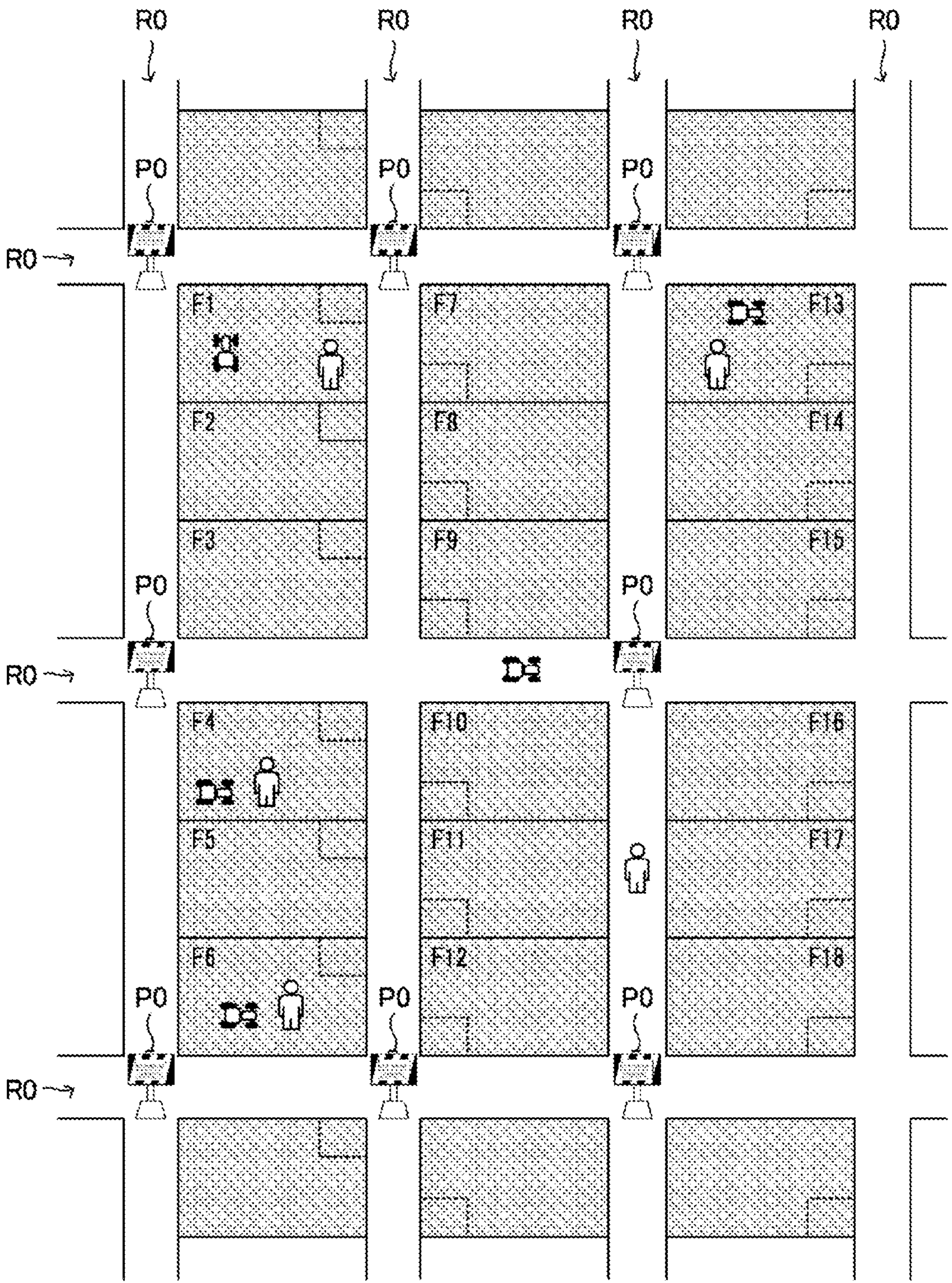
FIG. 20 is a diagram showing an example of placing the sign according to the embodiment of the present invention.

The following is a specific example of a setting method of the automatic run permission area AR1. For example, the setting process unit 211 sets, as the automatic run permission area AR1, the range identified based on the position information of each of plural signs P0 (an example of communication device) placed on the road R0. FIG. 19 shows an example of the configuration of the sign P0. As shown in FIG. 19, the sign P0 is a sign board provided with a sending unit Pa capable of sending the position information (latitude and longitude information) and a display unit Pb displaying information to prohibit an entry into the automatic run permission area AR1 ("no passage"). For example, the operator, for closing the range around the fields F1 to F12 thereby to prevent the third party from entering, blocks the road R0 for entering the fields F1 to F12. Specifically, as shown in FIG. 20, the operator places the sign P0 in each position to enter an entire area on the road R0 around the entire area of the fields F1 to F12. In the example shown in FIG. 20, the operator places the signs P0 in eight sites on the road R0. Placing the sign P0 makes it possible to alert the third party.

Figure 21:
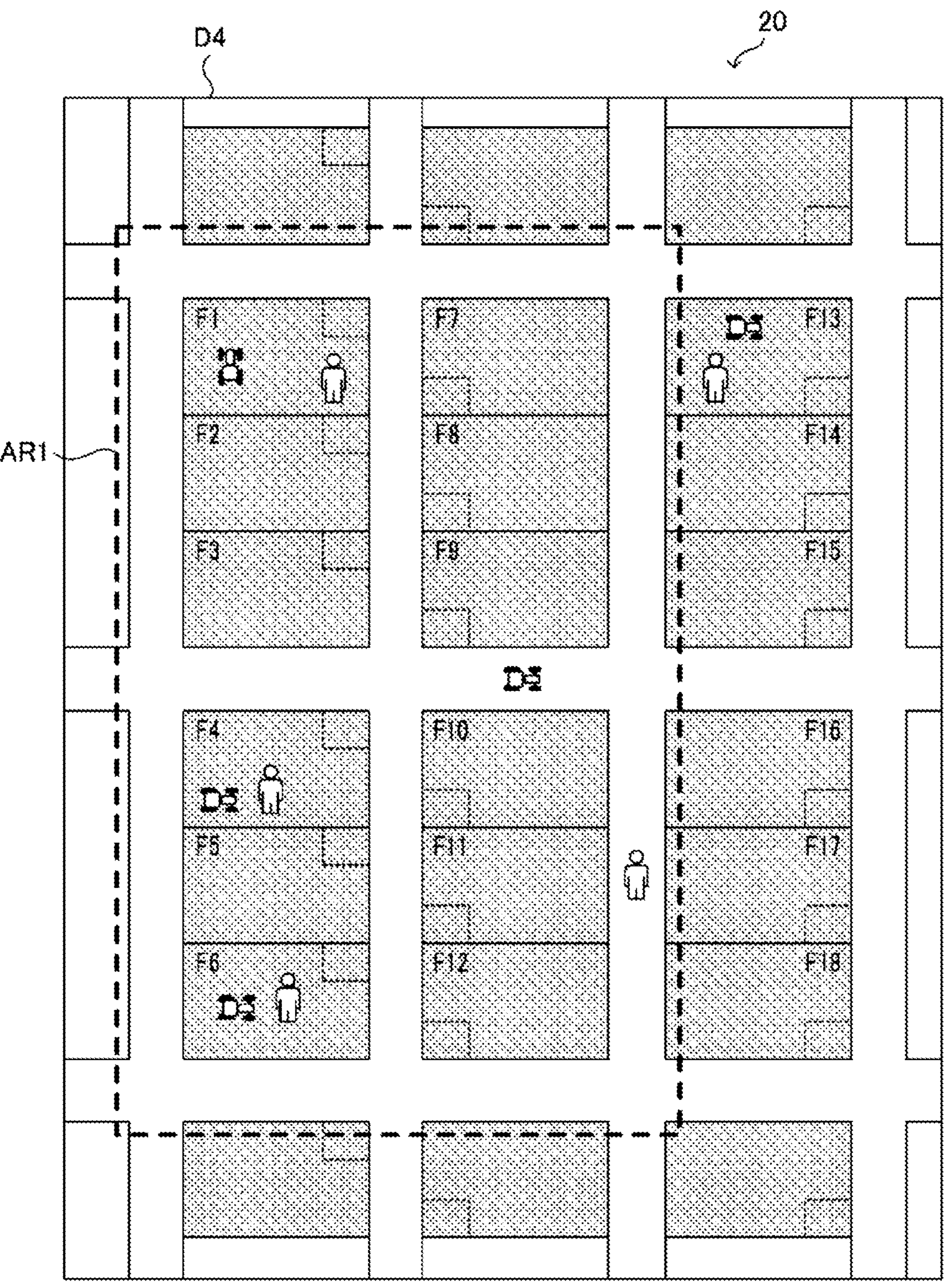
FIG. 21 is a diagram showing an example of an automatic run permission area according to the embodiment of the present invention.

When having acquired the position information from each of the eight signs P0 placed on the road R0, the setting process unit 211 sets, as the automatic run permission area AR1, the range around the road R0 that connects the positions of the respective signs P0. The setting process unit 211, when having set the automatic run permission area AR1, causes a frame image of the automatic run permission area AR1 to be displayed on the map displayed on the set screen D4 of the operation terminal 20, as shown in FIG. 21. Further, the setting process unit 211 causes the position information of one or more work vehicles 10 communicable with the operation terminal 20 and the position information of the operator to be displayed on the set screen D4 (see FIG. 21). Further, the position information of the operator may be the position information of the operation terminal 20 possessed by the operator, or may be the position information of a communication device (such as a communication tag)

possessed by the operator. Each operator checks the set screen D4 on the operator's own operation terminal 20, thereby making it possible to grasp the area for the work vehicle 10 to automatically run (automatic run permission area AR1), the position of each of the work vehicles 10, the position of each of the operators (position of operation terminal 20), and the like.

Figure 22:
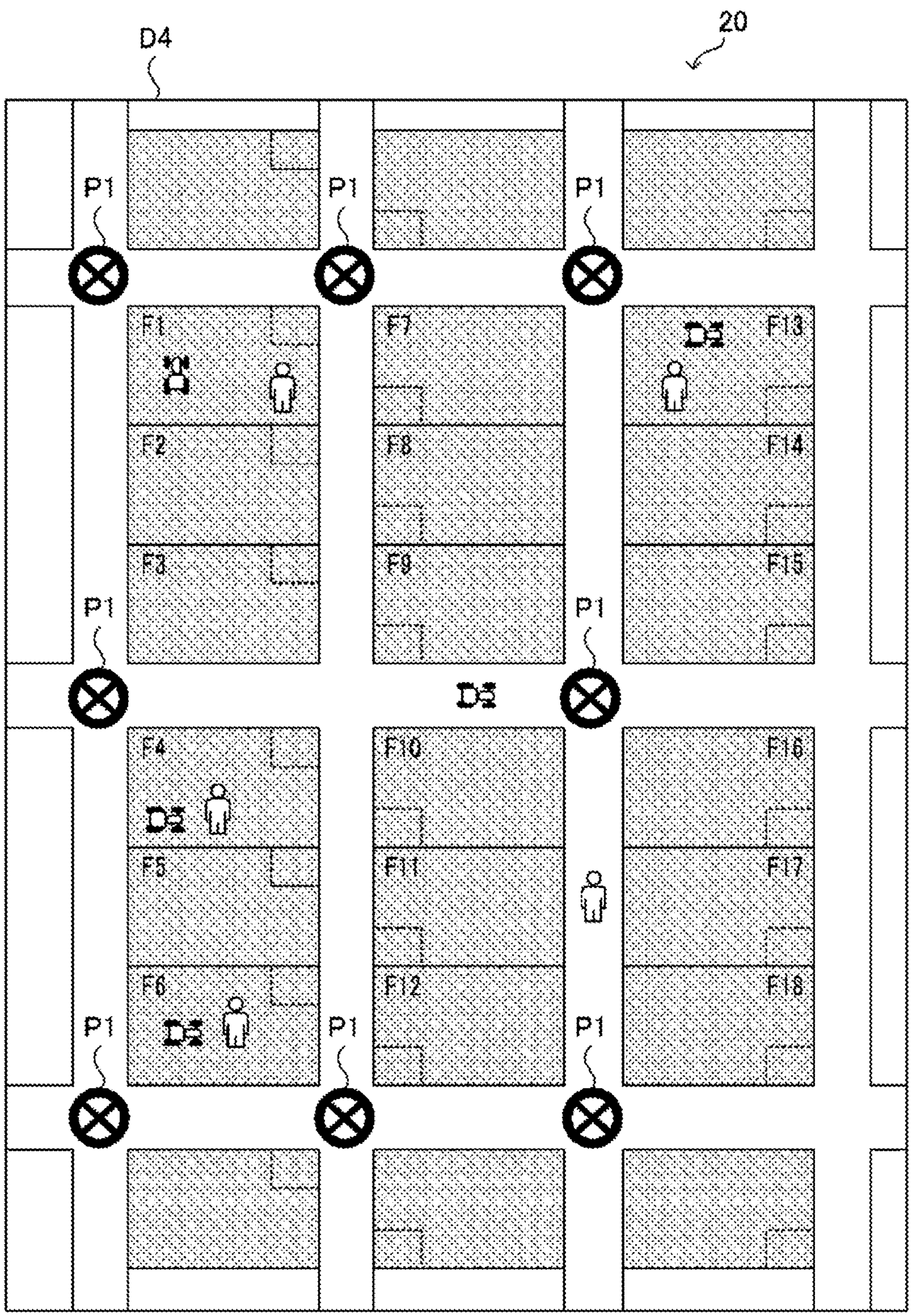
FIG. 22 is a diagram showing an example of a set screen displayed at an operation terminal according to the embodiment of the present invention.

As another example of the setting method of the automatic run permission area AR1, the setting process unit 211 may set, as the automatic run permission area AR1, the area selected by the user in the map information, for example. For example, as shown in FIG. 22, the operator, on the set screen D4 of the operation terminal 20, registers a blockade point P1 on the map. Here, the operator designates (touch operation, etc.) eight points on the map on the set screen D4 thereby to register the blockade point P1. Receiving the position of the blockade point P1 registered by the operator, the setting process unit 211 sets, as the automatic run permission area AR1, the range around the road R0 connecting the respective positions. The setting process unit 211, when having set the automatic run permission area AR1, causes the automatic run permission area AR1 to be displayed on the map displayed on the set screen D4 of the operation terminal (see FIG. 21). Further, in this setting method, the sign P0 does not need to be provided with the communication function (sending unit Pa) that sends the position information. For alerting the third party, however, the sign P0 is placed in a position that corresponds to the automatic run permission area AR1 on the road R0.

Figure 23:
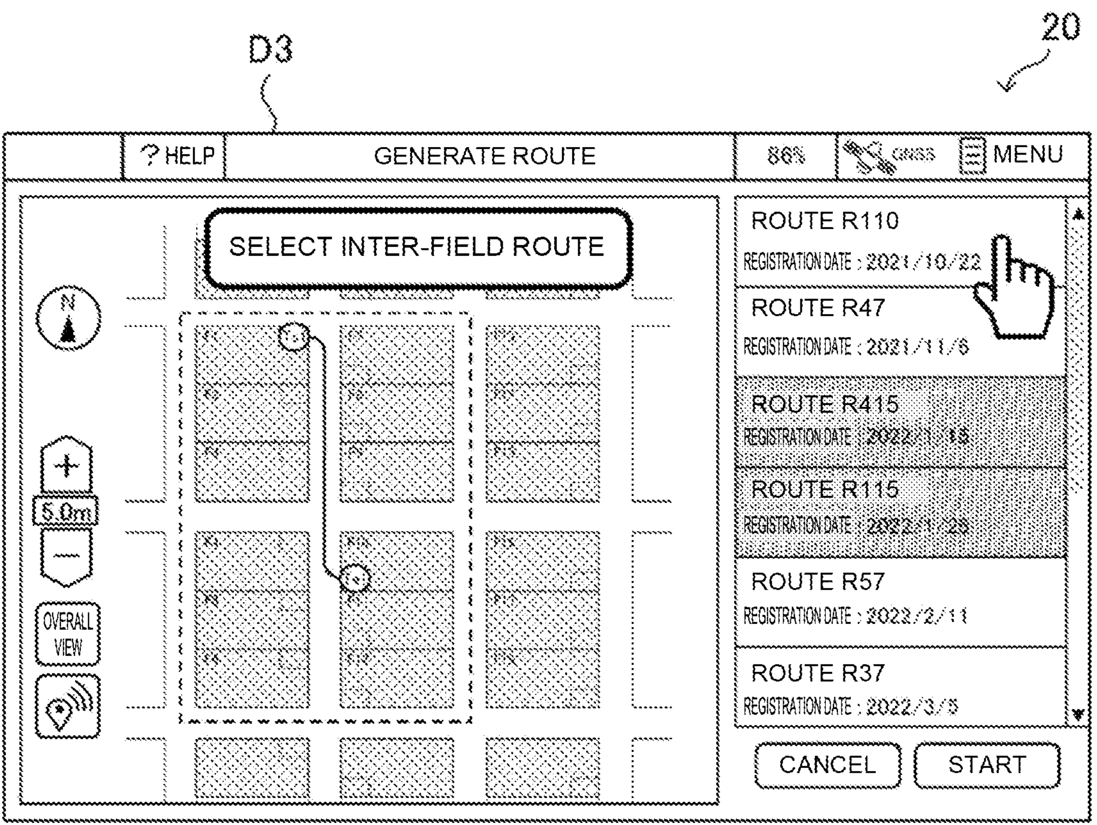
FIG. 23 is a diagram showing an example of a route generation screen displayed at the operation terminal according to the embodiment of the present invention.

When having set the automatic run permission area AR1, the setting process unit 211 causes, among the preset plural inter-field routes, the inter-field route positioned in the automatic run permission area AR1 to be settably displayed on the route generation screen D3. Further, the setting process unit 211, at the operation terminal 20, causes each of the automatic run permission area AR1 and the inter-field route to be identifiably displayed on the map information (see FIG. 23). Further, as shown in FIG. 23, for example, the setting process unit 211 causes the automatic run permission area AR1 to be displayed on the map on the route generation screen D3, causing a plurality of preset inter-field routes to be displayed (see FIG. 8). Here, the setting process unit 211, when all of the inter-field routes (the entire section from the route start position to the route end position) are positioned in the automatic run permission area AR1, causes the above inter-field routes to be displayed in a manner to be selectable by the operator. Meanwhile, the setting process unit 211, when at least a part of the inter-field route (at least a part of the entire section from the route start position to the route end position) is positioned outside the automatic run permission area AR1, causes the above inter-field route to be displayed in a manner to be unselectable by the operator.

Figure 24:
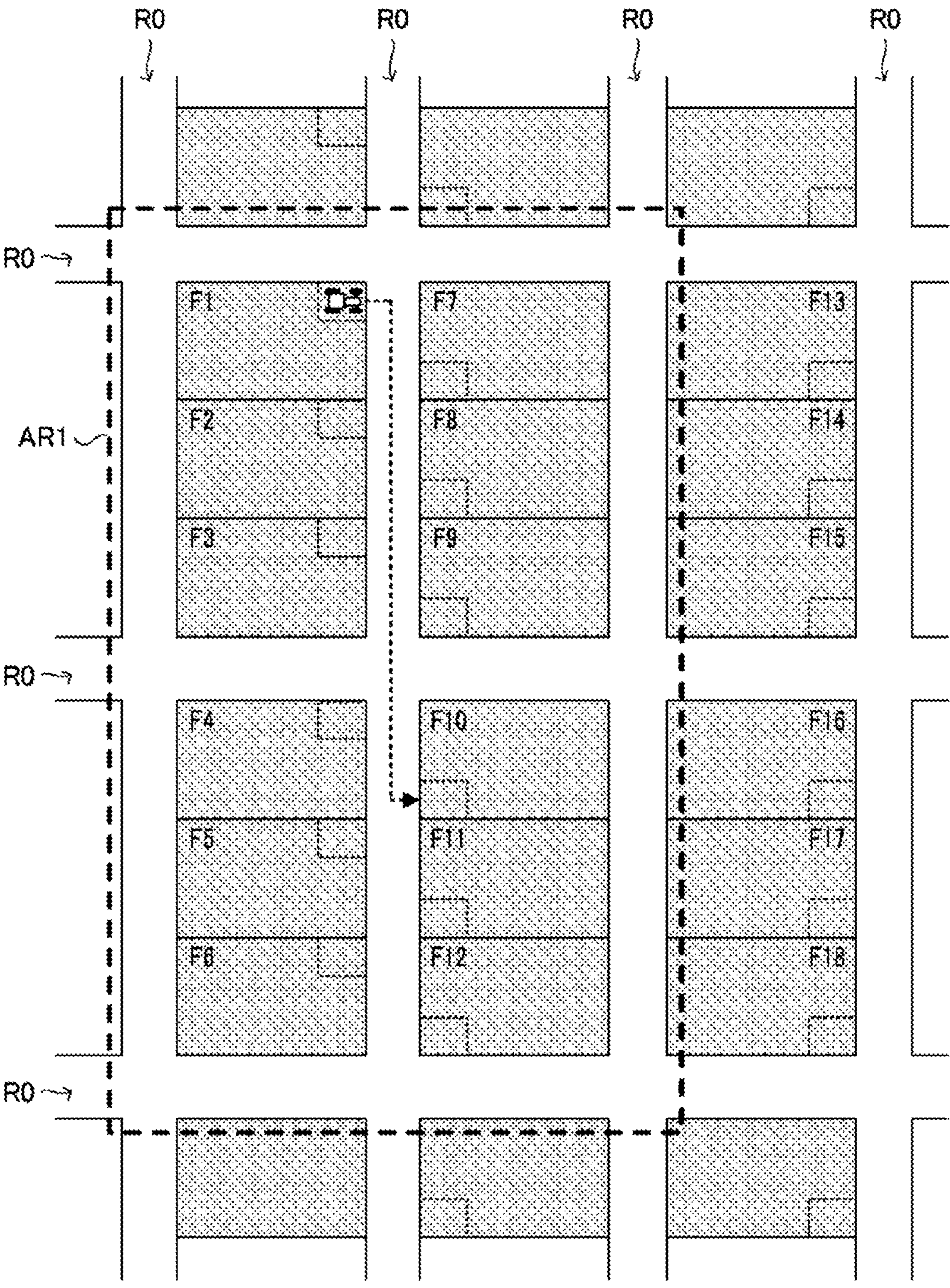
FIG. 24 is a diagram showing an example of the inter-field route according to the embodiment of the present invention.

In the example shown in FIG. 23, for example, "Route R110" shows the inter-field route (see FIG. 24) that connects the field F1 with the field F10, and all of the above inter-field routes are positioned in the automatic run permission area AR1. In this case, the setting process unit 211 causes "Route R110" to be selectably displayed on the set screen D4 (see FIG. 23).

Figure 25:
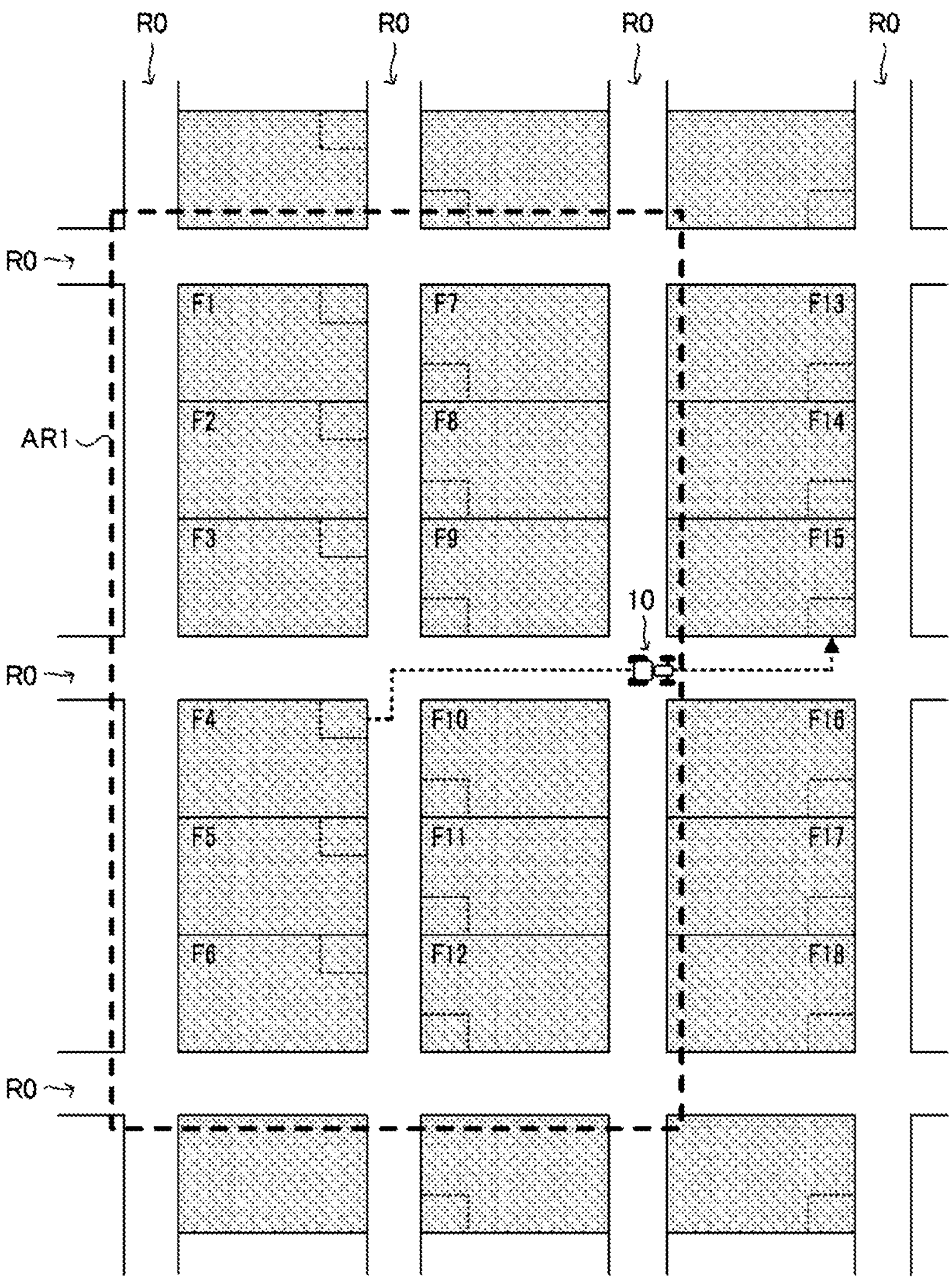
FIG. 25 is a diagram showing another example of the inter-field route according to the embodiment of the present invention.

Contrary to this, "Route R415", for example, shows the inter-field route that connects the field F4 with the field F15, and among the above inter-field routes, a part on the field F15 side is positioned outside the automatic run permission area AR1 (see FIG. 25). In this case, the setting process unit 211 causes "Route R415" to be unselectably displayed (for example, grayed out) on the set screen D4 (see FIG. 23).

Further, the setting process unit 211, when the operator has selected the inter-field route that is at least partially placed outside the automatic run permission area AR1, may make a notification of error information. For example, the setting process unit 211, when the operator has selected "Route R415", may cause a message to be displayed, which says that "Route R415" is not settable as the inter-field route.

When the operator, on the set screen D4, selects "Route R110" and presses down the start button (see FIG. 23), the output process unit 215 outputs, to the work vehicle 10, the route data of the inter-field route.

The run process unit 111 causes the work vehicle 10 to automatically run following the inter-field route in the automatic run permission area AR1 set at the operation terminal 20. With this, the work vehicle 10, in the automatic run permission area AR1, automatically runs from the field F1 to the field F10 following the inter-field route ("Route R110") (see FIG. 24). Note that, the run process unit 111, for the work vehicle 10 to go out of the field F1 to the road R0, transiently stops the work vehicle 10 in the start position of the inter-field route. This makes it possible to check the safety of the road R0. Further, the run process unit 111, provided that the operator's instruction (instruction to restart automatic run) is acquired after the work vehicle 10 has been transiently stopped, may cause the work vehicle 10 to start the automatic run on the inter-field route.

As another embodiment, the setting process unit 211 may cause the inter-field route, where at least a part of the inter-field route is placed outside the automatic run permission area AR1, to be selectably displayed on the route generation screen D3 (see FIG. 23). For example, "Route R415" shows the inter-field route that connects the field F4 with the field F15, and among the above inter-field routes, a part on the field F15 side is positioned outside the automatic run permission area AR1. When the operator, on the set screen D4, selects "Route R415" and presses down the start button (see FIG. 23), the output process unit 215 outputs, to the work vehicle 10, the route data of the inter-field route. In this case; when the work vehicle 10, for automatically running from the field F4 to the field F15 following the inter-field route ("Route R415"), reaches the boundary of the automatic run permission area AR1 (see FIG. 25), the run process unit 111 causes the work vehicle 10 to stop the automatic run. In this way, the run process unit 111 so controls the run that the work vehicle 10 automatically running does not go outside the automatic run permission area AR1.

When the run process unit 111 causes the work vehicle 10, which is automatically running on the inter-field route, to stop at the boundary of the automatic run permission area AR1 (see FIG. 25), the vehicle control unit 11 causes the work vehicle 10 to report information showing that the work vehicle 10 has stopped (stop information). For example, the vehicle control unit 11 may cause the above stop information to be audibly output, or may turn on or flash a display lamp.

Further, when the run process unit 111 causes the work vehicle 10, which is automatically running on the inter-field route, to stop at the boundary of the automatic run permission area AR1 (see FIG. 25), the operation control unit 21 causes the operation terminal 20 to display information showing that the work vehicle 10 has stopped (stop information). After checking the stop information, the operator may move to the stop position of the work vehicle 10, switch the work vehicle 10 to the manual run mode, and cause the work vehicle 10 to manually run to the target field F15 (see FIG. 25), for example. Further, as the other embodiment, the operator may so operate as to change the automatic run permission area AR1. For example; when the work vehicle 10 stops at the boundary of the automatic run permission area AR1, the operator, on the set screen D4 (see FIG. 21), makes such an operation as to extend the automatic run permission area AR1. The setting process unit 211, when safety can be ensured, such as the area to be extended being free from including the third party, extends the automatic run permission area AR1. This makes it possible for the stopped work vehicle 10 to restart the automatic run.

Thus, having set the automatic run permission area AR1 makes it possible for the work vehicle 10 to automatically run in the automatic run permission area AR1, prohibiting the work vehicle 10 from automatically running outside the automatic run permission area AR1. With this, setting, as the automatic run permission area AR1, the range that is easily monitored by the operator or observer makes it possible to cause the work vehicle 10 to automatically run with safety within and between the fields.

As described above, the automatic run system 1 according to the present embodiment sets the inter-field route that causes the work vehicle 10 to automatically run on the road R0 connecting the plural fields, and sets, as the automatic run permission area AR1 for permitting the automatic run of the work vehicle 10, the given range including the plural fields and the road R0 for entering each of the plural fields. As shown in FIG. 21, for example, the range around the fields F1 to F12 and the road R0 adjacent to each field is set as the automatic run permission area AR1. According to the above configuration, the plural work vehicles 10 can safely move between the fields in the automatic run permission area AR1. Further, the operator or observer can easily control (monitor) the work vehicle 10 in the automatic run permission area AR1.

Further, placing the sign P0 at the boundary of the automatic run permission area AR1 (see FIGS. 19 and 20) can prevent the third party from entering the automatic run permission area AR1, thus making it possible for the work vehicle 10 to automatically run with safety in the automatic run permission area AR1.

Here, when, in the case of the automatic run permission area AR1 having been set, having detected the third party (intruder) that enters the automatic run permission area AR1, the operation control unit 21 causes information, which shows the detecting of the intruder, to be reported at the work vehicle 10 and the operation terminal 20 which are in the automatic run permission area AR1.

Figure 26:
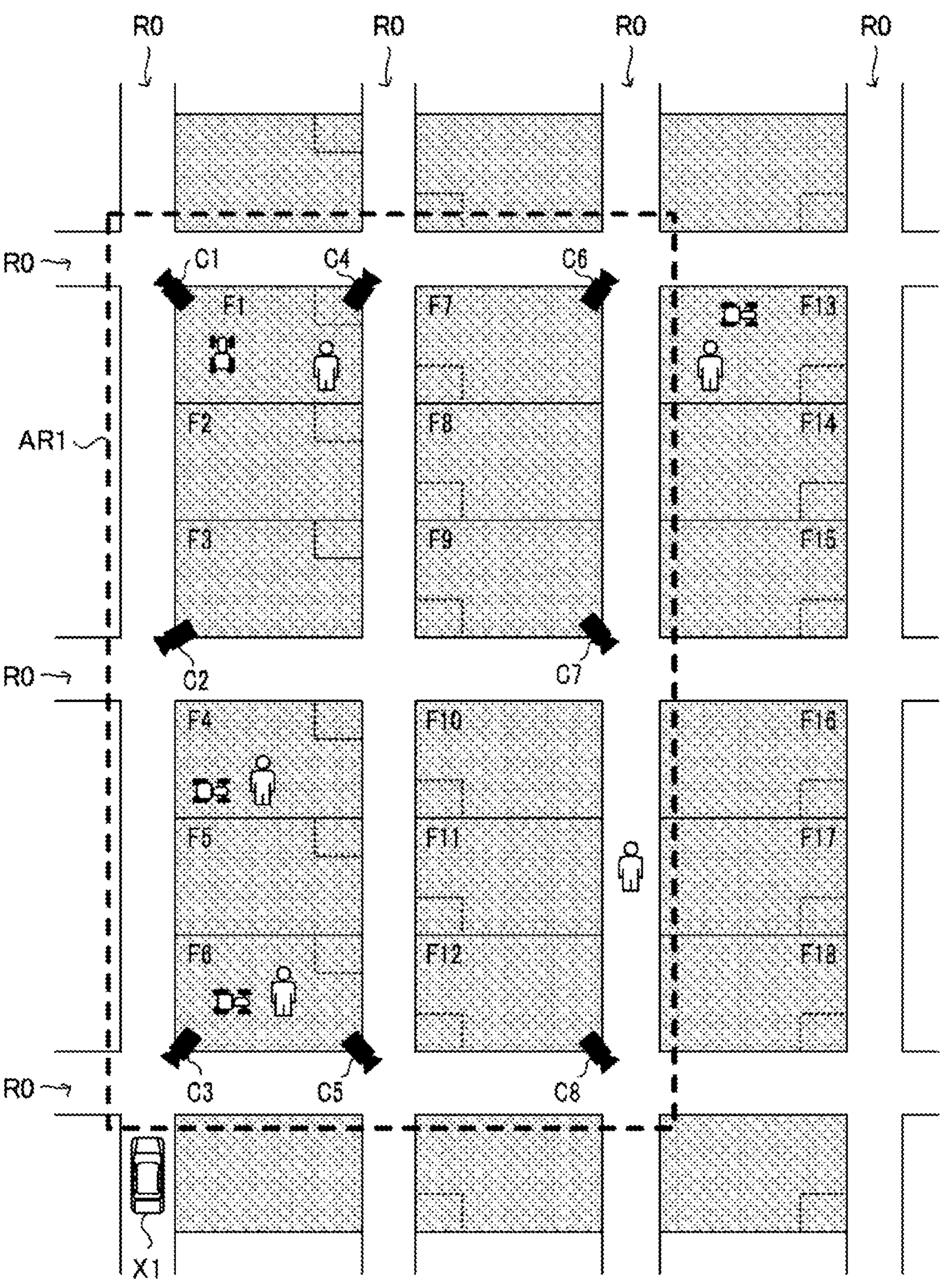
FIG. 26 is a diagram showing an example of placing a camera according to the embodiment of the present invention.

Specifically, as shown in FIG. 26, cameras are placed on the road R0 that allows for an entry in the automatic run permission area AR1. Here, eight cameras C1 to C8 are placed. Further, each of the cameras may be installed on one of the respective signs P0 (see FIG. 20). The above camera is provided with a communication function, and sends a captured image to the operation terminal 20 and the work vehicle 10 which are communicable with the camera and which are positioned in the automatic run permission area AR1. When detecting a mobile object such as a vehicle or a person (hereinafter referred to as the intruder), for example, the camera takes a picture of the mobile object and sends the captured image.

Figure 27:
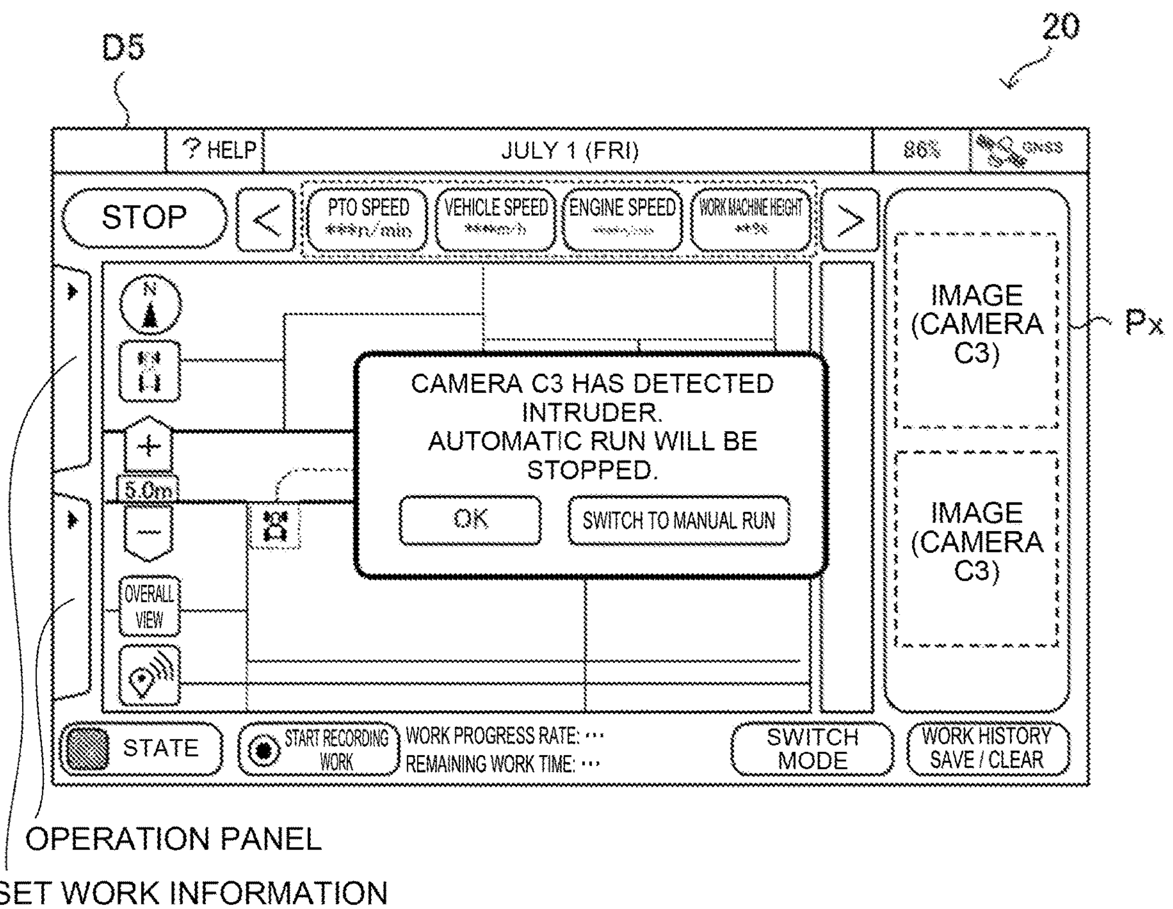
FIG. 27 is a diagram showing an example of the run screen displayed at the operation terminal according to the embodiment of the present invention.

When the camera has detected the intruder, the operation control unit 21, on a run screen D5, displays a message, as shown in FIG. 27, for example, showing that the intruder outside the automatic run permission area AR1 has been detected. For example, one or more operation terminals 20, which are communicable with the camera having detected the intruder and which are in the automatic run permission area AR1, display the above message when, from the camera, acquiring information showing the detecting of the intruder. Further, the operation control unit 21 causes the run screen D5 to display a captured image Px of the camera. In the example shown in FIG. 26; when the camera C3 has detected an intruder X1, the operation control unit 21 causes the run screen D5 to display the captured image Px captured by the camera C3 (see FIG. 27). This allows the operator and the like to be notified that the intruder has approached the automatic run permission area AR1.

Further, the vehicle control unit 11, when the camera has detected the intruder, may cause the work vehicle 10 to output an audible message saying that the intruder has been detected, or to turn on or flash a display lamp.

Further, the vehicle control unit 11, when the camera has detected the intruder, may cause each of the work vehicles 10, which are positioned in the automatic run permission area AR1, to stop the automatic run. For example, one or more work vehicles 10, which are communicable with the camera that has detected the intruder and which are in the automatic run permission area AR1, stop the automatic run when, from the camera, acquiring information showing the detecting of the intruder.

Further, the operation control unit 21, when the camera has detected the intruder, may display, on the run screen D5, a message to stop the automatic run of the work vehicle 10, as shown in FIG. 27. Further, the operation control unit 21, on the run screen D5, may display a switch button that receives an operation to switch the work vehicle 10 to the manual run mode. When the operator presses down the above switch button on the run screen D5, the vehicle control unit 11 switches the run mode of the work vehicle 10 from the automatic run mode to the manual run mode. This allows the operator to board the work vehicle 10 and manually operate the work vehicle 10.

In the above configuration, when the above camera has detected the intruder, the vehicle control unit 11 stops all of the work vehicles 10 that automatically run in the automatic run permission area AR1; as the other embodiment, however, the vehicle control unit 11 may control the run of each of the work vehicles 10 in the automatic run permission area AR1 based on at least any of the position and work content of the work vehicle 10.

For example, as shown in FIG. 26; when the camera C3 has detected the intruder X1, the work vehicle 10 that is automatically running in the field F6 is positioned near the intruder X1, so the work vehicle 10 stops the automatic run. Contrary to the above, the work vehicle 10 automatically running in the field F1 is positioned far from the intruder X1; thus, the work vehicle 10 continues the automatic run. Further, the work vehicle 10 automatically running in the field F4 is farther from the intruder X1 than the work vehicle 10 in the field F6 and closer to the intruder X1 than the work vehicle 10 in the field F1; thus, the above work vehicle 10 continues the automatic run by slowing down vehicle speed. Further, the work vehicle 10 that automatically runs on the inter-field route in the automatic run permission area AR1 continues (or stops) the automatic run by slowing down the vehicle speed. Thus, the run process unit 111, when the camera has detected the intruder, may control the run according to the position of the work vehicle 10.

Further, for example, when being in the process of performing the work by a low speed run, the work vehicle 10 in the field F6 continues to automatically run, and when being in the process of performing the work by a high speed run, the work vehicle 10 continues to automatically run (or stop) by slowing down the vehicle speed. Thus, the run process unit 111, when the camera has detected the intruder, may control the run of the work vehicle 10 according to the work content.

Further, the vehicle control unit 11, when the camera has detected the intruder, may enhance the safety function of the work vehicle 10. For example, the vehicle control unit 11, when the camera has detected the intruder, sets the sensitivity level of an obstacle sensor higher. This allows for a rapid detection of the intruder X1 that has entered the automatic run permission area AR1, for example.

Further, the vehicle control unit 11, when the camera has detected the intruder, may change the inter-field route set for the work vehicle 10. When the work vehicle 10 in the field F4 moves to the field F12, for example; if the camera detects the intruder, the vehicle control unit 11 causes the work vehicle 10 to automatically run following a detour route acquired by changing the inter-field route between the field F4 and the field F12. For example, the vehicle control unit 11 sets up the detour route which is away from the intruder X1 that has entered the automatic run permission area AR1 and which passes through the road R0.

As described above, the automatic run system 1, when having set the automatic run permission area AR1, monitors the intruder that enters the automatic run permission area AR1, and, when having detected the intruder, controls the run of the work vehicle 10 in the automatic run permission area AR1. This allows the work vehicle 10 in the automatic run permission area AR1 to automatically run with safety.

As the other embodiment, the automatic run system 1, in the automatic run permission area AR1, may set an exclusion section for prohibiting the automatic run of the work vehicle 10. When there is an obstacle or a poor road surface state on the road R0 in the automatic run permission area AR1, for example, the operation control unit 21 sets the above as the exclusion section for prohibiting the automatic run. The operation control unit 21, when having set the exclusion section, so sets the inter-field route as to avoid the exclusion section. The operation control unit 21 generates the inter-field route that does not pass through the excluded section, for example. Further, when the exclusion section is set after the inter-field route is registered, the operation control unit 21 may change the inter-field route to a route that avoids the exclusion section. Further, the operation control unit 21, when plural inter-field routes connecting between the field F1 and the field F10 are registered, for example, may cause the inter-field route, which does not include the excluded section, to be selectably displayed or to be suggested to the operator. Further, the above exclusion section may be set by the operator to preliminarily register on the map, or may be automatically set based on the result of detecting, with an obstacle sensor or the like, the automatically running work vehicle 10.

The automatic run system 1 according to the present embodiment, since setting the automatic run permission area AR1 as the closed area ensures the safety within the automatic run permission area AR1, may omit the process of reporting the specific information even when, for example, having detected that the door of the work vehicle 10 has been opened. Further, the automatic run system 1 may vary the method of reporting the specific information when the error of the work vehicle 10 is detected within the automatic run permission area AR1 from the method of reporting the specific information when the error of the work vehicle 10 is detected outside the automatic run permission area AR1. Further, the automatic run system 1 may vary the content of the specific information to be reported at the operation terminal 20 when the error of the work vehicle 10 is detected within the automatic run permission area AR1 from the content of the specific information to be reported at the operation terminal 20 when the error of the work vehicle 10 is detected outside the automatic run permission area AR1.

Further; when the detection process unit 112 has detected the error of the work vehicle 10 in the automatic run permission area AR1, the report process unit 113 may cause the specified information to be reported at all of the operation terminals 20 positioned within the automatic run permission area AR1, or may cause the specified information to be reported, among all of the operation terminals 20 positioned within the automatic run permission area AR1, at one or more operation terminals 20 identified according to the position of the work vehicle 10 to which the error occurred. Further, the report process unit 113 may cause the specific information, which corresponds to each of the positions of the plural operation terminals 20, to be reported within the automatic run permission area AR1.

It is noted that the operation terminal 20 may be capable of accessing, via the communication network N1, a web site (agricultural support site) of an agricultural support service provided by a server (not shown). In this case, a browser program is performed by the operation control unit 21, thereby making it possible for the operation terminal 20 to function as a terminal for operating the server. Then, the server includes each of the above process units, and performs each of the above processes.

Figure 28:
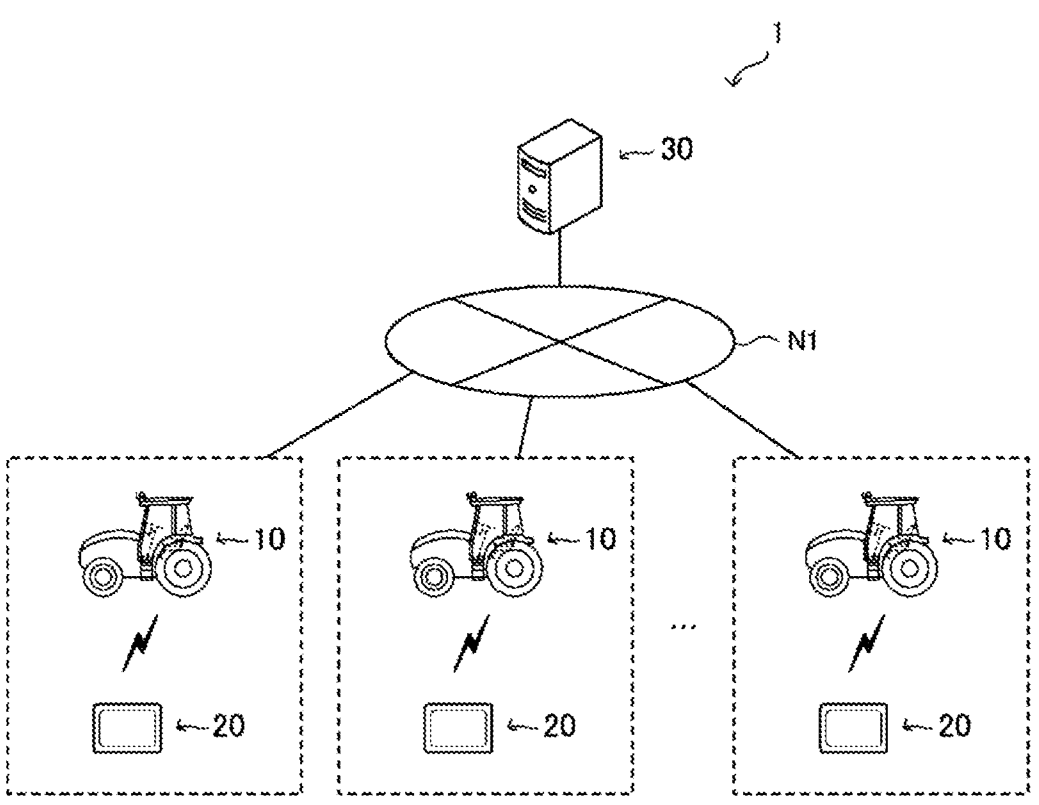
FIG. 28 is a block diagram showing another configuration of the automatic run system according to the embodiment of the present invention.

Further, in the above embodiment, the plural work vehicles 10 and the plural operation terminals 20 are so configured as to be communicable with each other; as another embodiment, however, as shown in FIG. 28, a server 30 (for example, a cloud server) may integrally control the plural work vehicles 10 and the plural operation terminals 20 communicable with the respective work vehicles 10, for example. For example, the server 30 causes each of the plural work vehicles 10 to run in the field, detects an error of at least any of the plural work vehicles 10, and when having detected an error of the work vehicle 10*a* among the plural work vehicles 10, causes the specific information on the work vehicle 10*a* to be reported on the operation terminal 20 communicable with each of the plural work vehicles 10. Thus, the server 30 determines whether or not there is an error in each of the plural work vehicles 10, and when having detected an error of the work vehicle 10, causes the specific information to be reported in each of the plural operation terminals 20.

As described above; in the above embodiment, the work vehicle corresponds to the automatic run system according to the present invention, but the automatic run system according to the present invention may be so configured as to include the server alone or may be so configured as to include the operation terminal 20 alone. Further, the automatic run system according to the present invention may be so configured as to include the work vehicle 10 and the operation terminal 20, or may be so configured as to include the work vehicle 10, the operation terminal 20, and the server 30.

APPENDICES

Additional remarks below are a summary of the present invention extracted from the embodiments described above. Configurations and processing functions described in additional remarks below may be selected and combined as appropriate.

Appendix 1

An automatic run method including: causing each of a plurality of work vehicles to automatically run in a work area; detecting an error of at least any of the plurality of work vehicles; and causing, when an error of a first work vehicle among the plurality of work vehicles is detected, specific information on the first work vehicle to be reported at an operation terminal communicable with each of the plurality of work vehicles.

Appendix 2

The automatic run method according to appendix 1, wherein the specific information of a content, which corresponds to a distance from the first work vehicle to the operation terminal, is caused to be reported.

Appendix 3

The automatic run method according to appendix 1 or 2, wherein the operation terminal, by a first communicable method and a second communication method which is shorter in communication distance than the first communication method, is communicable with each of the plurality of work vehicles.

Appendix 4

The automatic run method according to appendix 3, wherein when the operation terminal is communicable by the first communication method, first specific information is caused to be reported at the operation terminal, and when the operation terminal is communicable by the second communication method, second specific information different from the first specific information is caused to be reported at the operation terminal.

Appendix 5

The automatic run method according to appendix 4, wherein the first specific information includes identification information, which identifies the first work vehicle, and error information on the error, and the second specific information includes the identification information, which identifies the first work vehicle, the error information on the error, and action information on how to act against the error.

Appendix 6

The automatic run method according to any of appendices 3 to 5, wherein the operation terminal includes a first operation terminal communicable with each of the plurality of work vehicles by the first communication method, and a second operation terminal communicable with each of the plurality of work vehicles by the second communication method.

Appendix 7

The automatic run method according to appendix 6, wherein when having detected the error of the first work vehicle, the automatic run method causes the specific information to be reported at each of the first operation terminal and the second operation terminal, and when a given instruction for the specific information is received at the first operation terminal from a user, the automatic run method further causes given information to be reported at the second operation terminal.

Appendix 8

The automatic run method according to any of appendices 1 to 7, wherein the specific information of a content, which corresponds to a work state of the user of the operation terminal, is caused to be reported.

Appendix 9

The automatic run method according to any of appendices 1 to 8, wherein the automatic run method causes the work vehicle to automatically run following an inter-area route preset for a connection route that connects a plurality of the work areas, and the automatic run method causes a method of reporting the specific information when a given error is detected in the first work vehicle in the work area to differ from a method of reporting the specific information when the given error is detected in the first work vehicle in the inter-area route.

Appendix 10

The automatic run method according to any of appendices 1 to 9, wherein the automatic run method causes the specific information to be reported when the operation terminal is positioned at a given distance or more from the first work vehicle, and does not cause the specific information to be reported when the operation terminal is positioned at less than the given distance from the first work vehicle.

REFERENCE SIGNS LIST

1 automatic run system
10 work vehicle
11 vehicle control unit
20 operation terminal
21 operation control unit
30 server
111 run process unit
112 detection process unit
113 report process unit
161 positioning control unit
211 setting process unit
212 reception process unit
213 acquisition process unit
214 generation process unit
215 output process unit
AR1 automatic run permission area
D1 menu screen
D2 teaching operation screen
D3 route generation screen
D4 set screen
D5 run screen
D6 monitor screen
E1 inter-field route information table
F1 to F4 field (work area)
Mx position information
Px captured image
R0 road (connection route)
R1 target route
R2 target route
R12 inter-field route (inter-area route)

The invention claimed is:

1. An automatic run method that performs operations comprising:

causing each of a plurality of work vehicles to automatically run in and between a plurality of work areas;

detecting an error of at least a first work vehicle of the plurality of work vehicles; and causing, based on the error of the first work vehicle being detected and a position of the first work vehicle when the error is detected, specific information on the first work vehicle to be reported at an operation terminal of a plurality of operation terminals communicable with each of the plurality of work vehicles, wherein;

content of the specific information varies according to a distance between the operation terminal and the first work vehicle when the error is detected, when the position of the first work vehicle is within a work area of the plurality of work areas, the specific information is reported at one or more but less than all of the plurality of operation terminals including the operation terminal, and when the position of the first work vehicle is on an inter-area route that connects a first work area of the plurality of work areas and a second work area of the plurality of work areas, the specific information is reported to each operation terminal of the plurality of operation terminals including the operation terminal.

2. The automatic run method according to claim 1, wherein each of the plurality of operation terminals is communicable with each of the plurality of work vehicles by a first communication method and a second communication method which is shorter in communicable distance than the first communication method.

3. The automatic run method according to claim 2, wherein:

when the operation terminal of the plurality of operation terminals is communicable by the first communication method, first specific information is caused to be reported at the operation terminal, and when the operation terminal is communicable by the second communication method, second specific information different from the first specific information is caused to be reported at the operation terminal.

4. The automatic run method according to claim 3, wherein:

the first specific information includes identification information, which identifies the first work vehicle, and error information on the error, and the second specific information includes the identification information, which identifies the first work vehicle, the error information on the error, and action information on how to act against the error.

5. The automatic run method according to claim 2, wherein the plurality of operation terminals includes a first operation terminal communicable with each of the plurality of work vehicles by the first communication method, and a second operation terminal communicable with each of the plurality of work vehicles by the second communication method.

6. The automatic run method according to claim 5, wherein:

when having detected the error of the first work vehicle, the automatic run method causes the specific information to be reported at each of the first operation terminal and the second operation terminal, and when a given instruction for the specific information is received at the first operation terminal from a user, the automatic run method further causes given information to be reported at the second operation terminal.

7. The automatic run method according to claim 1, wherein the specific information of a content, which corresponds to a work state of a user of the operation terminal of the plurality of operation terminals, is caused to be reported.

8. The automatic run method according to claim 1, wherein:

the automatic run method causes the first work vehicle to automatically run following an inter-area route that is preset for a connection route that connects the plurality of work areas, and the automatic run method causes a method of reporting the specific information when a given error is detected in the first work vehicle in the work area to differ from a method of reporting the specific information when the given error is detected in the first work vehicle in the inter-area route.

9. The automatic run method according to claim 1, wherein the automatic run method causes the specific information to be reported when the operation terminal of the plurality of operation terminals is positioned at a given distance or more from the first work vehicle, and does not cause the specific information to be reported when the operation terminal is positioned at less than the given distance from the first work vehicle.

10. The automatic run method according to claim 1, wherein the specific information includes first content when the operation terminal is less than a predetermined distance from the first work vehicle, and the specific information includes second content when the operation terminal is greater than or equal to the predetermined distance, the second content being different than the first content.

11. The automatic run method according to claim 1, wherein the operation terminal is closest in position to the first work vehicle out of the plurality of operation terminals when the error of the first work vehicle is detected, and when the position of the first work vehicle is within the work area of the plurality of work areas, the specific information is reported at the operation terminal.

12. An automatic run system comprising:

a run process unit configured to cause each of a plurality of work vehicles to automatically run in and between a plurality of work areas;

a detection process unit configured to detect an error of at least a first work vehicle of the plurality of work vehicles; and a report process unit configured to, based on the error of the first work vehicle being detected and a position of the first work vehicle when the error is detected, cause specific information on the first work vehicle to be reported at an operation terminal of a plurality of operation terminals communicable with each of the plurality of work vehicles, wherein:

content of the specific information varies according to a distance between the operation terminal and the first work vehicle when the error is detected, when the position of the first work vehicle is within a work area of the plurality of work areas, the specific information is reported at one or more but less than all of the plurality of operation terminals including the operation terminal, and when the position of the first work vehicle is on an inter-area route that connects a first work area of the plurality of work areas and a second work area of the plurality of work areas, the specific information is reported to each operation terminal of the plurality of operation terminals including the operation terminal.

13. A non-transitory, computer-readable medium storing processor executable instructions that, when executed by one or more processors, cause the one or more processors to perform operations comprising:

causing each of a plurality of work vehicles to automatically run in and between a plurality of work areas;

detecting an error of at least a first work vehicle of the plurality of work vehicles; and causing, based on the error of the first work vehicle being detected and a position of the first work vehicle when the error is detected, specific information on the first work vehicle to be reported at an operation terminal of a plurality of operation terminals communicable with each of the plurality of work vehicles, wherein;

content of the specific information varies according to a distance between the operation terminal and the first work vehicle when the error is detected, when the position of the first work vehicle is within a work area of the plurality of work areas, the specific information is reported at one or more but less than all of the plurality of operation terminals including the operation terminal, and when the position of the first work vehicle is on an inter-area route that connects a first work area of the plurality of work areas and a second work area of the plurality of work areas, the specific information is reported to each operation terminal of the plurality of operation terminals including the operation terminal.

* * * * *